(12) United States Patent
Kamoi

(10) Patent No.: US 8,228,003 B2
(45) Date of Patent: Jul. 24, 2012

(54) ELECTRONIC BALLAST FOR AN HID LAMP WITH LAMP RE-START CONTROL

(75) Inventor: Takeshi Kamoi, Kyoto (JP)

(73) Assignee: Panasonic Corporation, Osaka (JP)

(*) Notice: Subject to any disclaimer, the term of this patent is extended or adjusted under 35 U.S.C. 154(b) by 284 days.

(21) Appl. No.: 12/758,473

(22) Filed: Apr. 12, 2010

(65) Prior Publication Data
US 2010/0259195 A1    Oct. 14, 2010

(30) Foreign Application Priority Data

Apr. 10, 2009  (JP) ................. 2009-096260

(51) Int. Cl.
G05F 1/00 (2006.01)
H05B 37/02 (2006.01)

(52) U.S. Cl. ............................ 315/291; 315/307
(58) Field of Classification Search .......... 315/307, 315/291, 224, 246, 209 R, 209 T 209 DC, 315/209 M, 209 SC, DIG. 7, DIG. 4, DIG. 5
See application file for complete search history.

(56) References Cited

U.S. PATENT DOCUMENTS

| 6,504,322 B2 * | 1/2003 | Takahashi et al. | 315/307 |
| 6,583,587 B2 * | 6/2003 | Ito et al. | 315/308 |
| 7,009,348 B2 * | 3/2006 | Mogilner et al. | 315/307 |

FOREIGN PATENT DOCUMENTS

| JP | 4272692 | 9/1992 |
| JP | 2001035674 | 9/2001 |

* cited by examiner

*Primary Examiner* — Douglas W Owens
*Assistant Examiner* — Minh D A
(74) *Attorney, Agent, or Firm* — Waddey & Patterson, P.C.; Mark J. Patterson

(57) ABSTRACT

An electronic ballast for a high intensity discharge lamp includes a control circuit for switching between a first operation period to operate a starting voltage generating circuit to start the lamp and a second operation period to maintain a steady arc discharge after the lamp has started, based on a detection result from a lighting detector circuit. The control circuit further includes a measurement circuit to measure operation information of the first operation period, circuits to control operation during the first operation period based on a result of measurement from the measurement circuit, and a reset circuit to initialize the operation information of the first operation period measured by the measurement circuit upon continuation of the second operation period for a reference time or longer.

8 Claims, 22 Drawing Sheets

ELECTRONIC BALLAST FOR AN HID LAMP WITH LAMP RE-START CONTROL

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

CROSS-REFERENCES TO RELATED APPLICATIONS

This application claims benefit of the following patent application(s) which is/are hereby incorporated by reference: Japan Patent Application No. 2009-096260, filed Apr. 10, 2009.

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

BACKGROUND OF THE INVENTION

The present invention relates to electronic ballasts for powering high-luminance lamps such as a high-pressure mercury lamp or metal halide lamp.

FIG. 21 is a circuit diagram of a conventional electronic ballast for a discharge lamp DL. FIG. 22 is a waveform chart illustrating the operation of the ballast of FIG. 21. The detailed configuration and operation of the ballast are described later in connection with the description of FIG. 2 and FIG. 3. Only a summary outline of the operation is described here.

When the high pressure discharge lamp DL is not illuminated, the ballast operates in a starting mode to start the lamp DL. In the starting mode, a step-down chopper circuit 12 outputs a DC voltage which is higher than the voltage which is applied when the lamp DL is in steady-state operation. The DC voltage is converted into a rectangular wave AC voltage by inverter circuit 13, and the rectangular wave AC voltage is applied to the lamp DL via a starting voltage generating circuit 2. When the polarity of the rectangular wave AC voltage is inverted, a voltage responsive switching element Q7 turns on and the starting voltage generating circuit 2 generates a high lamp starting voltage. When the starting voltage is applied to the lamp DL, dielectric breakdown occurs in the lamp and a glow discharge takes place.

After shifting to an arc discharge state, lighting detector circuit 31 detects the fact that the lamp DL has been started. The ballast operation is thereby shifted to a lighting mode. Then, an output detector circuit 12a detects an output voltage of the step-down chopper circuit 12, and a chopper control circuit 12b controls the operation of the step-down chopper circuit 12 so that a predetermined current corresponding to the output voltage can be provided, whereby rectangular wave-shaped appropriate power is supplied to the lamp DL via the inverter circuit 13 and the lamp DL lights in a steady-state. The temperature and pressure in the light-emitting tube of the lamp DL gradually increases after start-up, and the lamp DL transitions into a steady lighting state.

When the lamp DL is extinguished for some reason, the lighting detector circuit 31 detects the non-lighting state and determines that the lamp DL has extinguished. In such a case, to start the lamp DL again, a high starting voltage is generated and applied to the lamp DL by the starting voltage generating circuit 2. It is known that because the temperature and pressure in the light-emitting tube are very high when the lamp DL extinguishes from a steady lighting state, the dielectric breakdown voltage in this state can be as high as a few dozen kV. To restart the lamp DL immediately in this state, it is necessary to apply a voltage of a few dozen kV as described above to the lamp. This can cause problems of how to safely insulate the lamp fixture and wiring and can place high stresses on the lamp.

For example, in the case of an ordinary lamp having an Edison base 23 as shown in FIG. 23, when a voltage of a few dozen kV is applied, dielectric breakdown occurs in the Edison base 23 or in an area designated as A in an outer tube 22. As a result, the necessary voltage is not applied to the light-emitting tube 21. Therefore, ordinary ballasts are designed to generate and apply a dielectric breakdown voltage for a lamp of interest in a sufficiently cooled state (approximately 4 kV, for example) at start-up. Thus, when the lamp is extinguished from a steady lighting state, it cannot be immediately restarted. The lamp can be restarted when the temperature in the light-emitting tube decreases and the dielectric breakdown voltage decreases to the high starting voltage that is generated by the starting voltage generating circuit 2 or lower.

As described above, immediately after a lamp extinguishes from a steady lighting state, the temperature and pressure in the light-emitting tube are high and the dielectric breakdown voltage is very high. The output of the ballast in this state is generally the same as that in a no-load state in which the lamp is not connected. Because it is not easy to distinctly detect the no-load state and the state immediately after the extinguishing of the lamp, a high starting voltage is generated even in a no-load state. In addition, even when the lamp is at the end of its useful life and a starting failure occurs, the ballast generates a high starting voltage.

When a high starting voltage is generated over a long period of time in such a no-load state or at the end of useful life of a lamp, the ballast may be damaged. Therefore, some prior art ballasts use a technique in which, in the case of a lamp start failure, generation of a high starting voltage is repeated up to a predetermined number of times and the generation of a high starting voltage is stopped when the predetermined number of times is reached.

Moreover, when a lamp is extinguished from a steady lighting state, it may take ten minutes or more to restart it, depending on the type of the lamp and the structure and the installation conditions of the fixture. Even when a high starting voltage is continuously generated during that time, the lamp cannot be started and a high voltage of about 4 kV, for example, continues to be applied between the lamp terminals. Because this wastes electric power and can be unsafe, some have proposed generating a high starting voltage intermittently.

The possible reasons for extinguishing of an HID lamp include power shutdown (such as switched shutdown or power failure) and brief power fluctuations such as instantaneous power failure or instantaneous voltage drop. When a power shutdown occurs, the control circuit is reset unless it has a non-volatile memory or the like because no power is supplied to the ballast for a relatively long period of time. Therefore, an operation to restart the lamp must be performed after the restoration of the power source.

On the other hand, when a brief power fluctuation such as instantaneous power failure or instantaneous voltage drop occurs, the lamp is extinguished but the operation of the control circuit is maintained by an electric charge accumulated in a capacitor for a control power source. If the number of start failures during the process of starting the lamp is maintained as the operation information of the control circuit as in some prior art ballasts, when the lamp is restarted after restoration of the power, the predetermined number of start failures is reached before a starting voltage is applied over the time necessary for restart, and the operation is stopped. In other cases, if the generation cycle of the intermittent high starting voltage is maintained as in other prior art ballasts, a failure occurs in which the operation is started from a quiescent period in the intermittent high starting voltage generating period and the high starting voltage cannot be immediately applied to the lamp.

In other prior art ballasts, a technique is proposed in which a detection circuit for detecting a change of a lamp from a lighting state to a non-lighting state is provided. The information during the previous starting process is reset when the fact that the lamp has extinguished is detected so that a high starting voltage can be applied immediately after the lamp is extinguished, and a sufficient time to apply a starting voltage necessary for restart can be insured.

In this prior art technique, when the lamp shifts from a lighting state to a non-lighting state, the information acquired during the previous starting process is reset. However, when the lamp extinguishes after it has been lighted for a short period of time before reaching a steady lighting state, there are cases where it is undesirable to reset the information acquired during the previous starting process.

For example, when an end-of-life lamp is connected, a phenomenon is known in which, after a dielectric breakdown is caused by the starting voltage and a glow discharge is formed, the lamp is extinguished after a brief transition to an arc discharge. In such a case, when the operation information during the starting process is reset upon detection of the fact that the lamp is extinguished, the operation information acquired during the starting process is reset every time the lamp is extinguished. Thus, a high starting voltage is applied every time the lamp is extinguished, and a failure occurs in which the cycle consisting of dielectric breakdown, glow discharge, arc discharge, lamp extinguished, and application of a high starting voltage continues endlessly and generation of the starting voltage cannot be stopped.

The present invention has been made in view of the above circumstances, and it is, therefore, an object of the present invention to provide a ballast which can prevent generation of an unnecessary high starting voltage to ensure power saving and safety even when a lamp fails to start at, for example, the end of useful life, and which can provide a lamp with reliable starting and restarting characteristics in normal cases.

BRIEF SUMMARY OF THE INVENTION

To solve the above problems, a ballast according to a first aspect of the present invention includes, as shown in FIG. 1, a power supply circuit or ballast circuit 1 for supplying electric power to a lamp DL, a starting voltage generating circuit 2 for generating a high starting voltage to start discharge of the lamp DL, and a control circuit 3 for controlling the power supply circuit 1 and the starting voltage generating circuit 2.

The control circuit 3 may include a lighting detector circuit 31 for detecting whether or not the lamp DL is lighting, a logic circuit adapted to switch between a first operation period (or mode) to operate the starting voltage generating circuit 2 to start discharge of the lamp DL and a second operation period (or mode) to maintain steady arc discharge after the lamp DL has started discharging, based on a result of detection by the lighting detector circuit 31. The control circuit 3 may further include a measurement circuit 32 adapted to measure operation information of the first operation period, circuits 33 and 34 adapted to control operation during the first operation period based on a result of measurement by the measurement circuit 32, and a reset circuit 36 adapted to initialize the operation information of the first operation period measured by the measurement circuit 32 when the second operation period has continued for a reference time or longer. As for the reset circuit 36, it is not essential to provide a measurement circuit 35 for measuring operation information of the second operation period, and the measurement circuit 32 for measuring operation information of the first operation period may serve also as the measurement circuit 35 (FIG. 18).

The invention according to a second aspect includes a circuit adapted to measure a starting voltage generating period for which a high starting voltage is generated during the first operation period (Step 2b in FIG. 7), and a circuit adapted to measure a starting voltage quiescent period during which generation of the high starting voltage is interrupted (Step 2d in FIG. 7), as the measurement circuit is adapted to measure operation information of the first operation.

The invention according a third aspect includes a step wherein operation information of the first operation period measured by the measurement circuit includes a measurement time of the starting voltage generating period for which a high starting voltage is generated (see Step 11a in FIG. 7, FIG. 10 and FIG. 12).

The invention according a fourth aspect includes a step wherein operation information of the first operation period measured by the measurement circuit includes the duration of the first operation period (see Step 11 in FIG. 4, FIG. 10 and FIG. 12).

The invention according to a fifth aspect is wherein the reference time is 0.5 seconds or longer.

The invention according to a sixth aspect is wherein the reference time is 30 seconds or shorter (see FIG. 24).

The invention according to a seventh aspect includes a step wherein the circuit adapted to measure the starting voltage generating period for which a high starting voltage is generated during the first operation continues measurement of the starting voltage generating period even after the lamp has lighted and a shift to the second operation period has been completed, and determines that the second operation period has continued for a reference time or longer upon a condition that the lamp has been lighting upon completion of the starting voltage generating period (see FIG. 18).

According to the present invention, when the lamp starts discharging and shifts into the second operation period, the operation information of the first operation period is not unconditionally initialized, and the operation information of the first operation period is initialized when the second operation period has continued for a predetermined reference time or longer. Therefore, even when an end-of-life lamp is connected, generation of an unnecessary high starting voltage is not continued, and, when a normal lamp is connected, the lamp can be reliably restarted even if brief power fluctuations such as instantaneous power failure or instantaneous voltage drop occur.

DETAILED DESCRIPTION OF THE INVENTION

Figure 1:
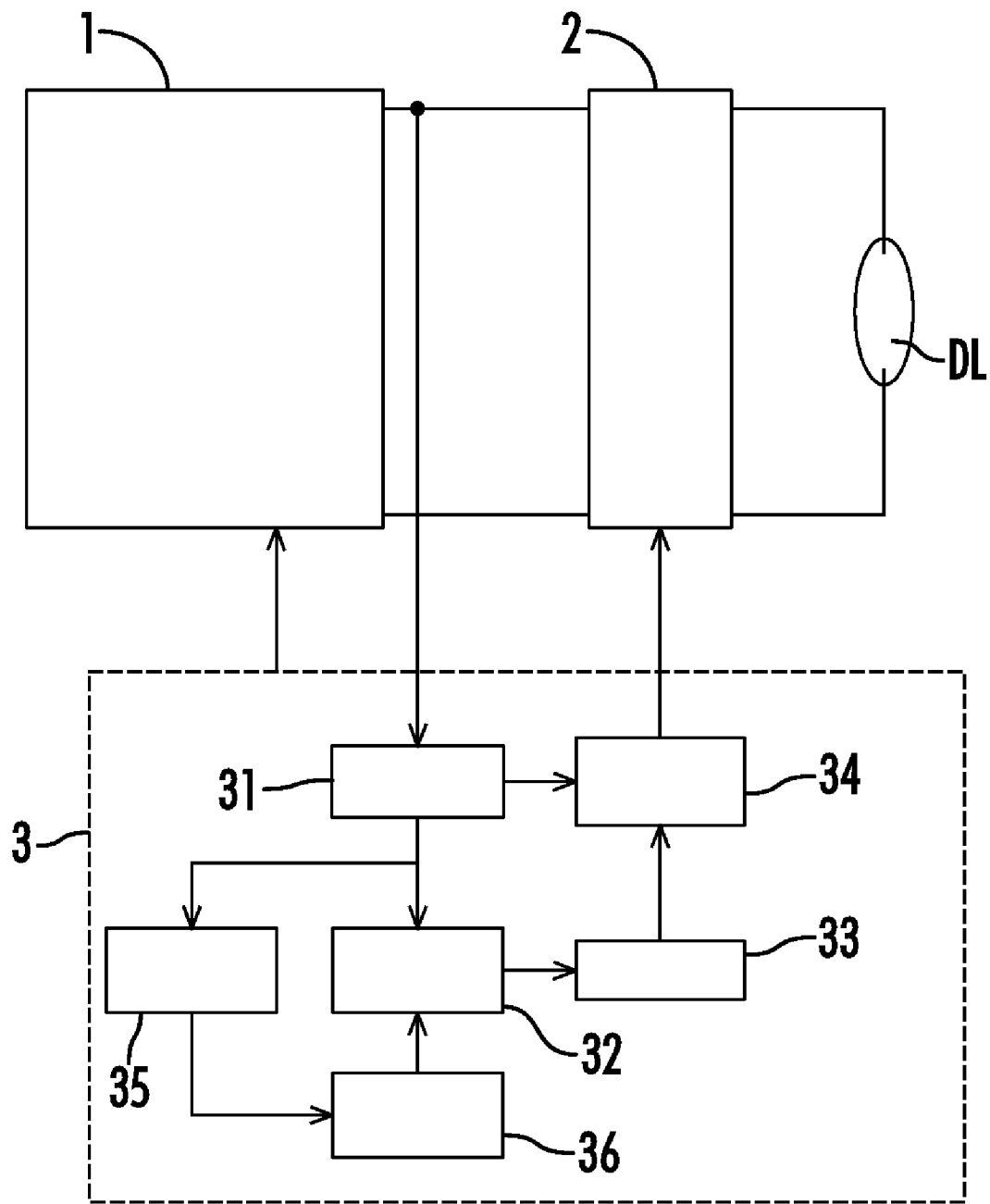
FIG. 1 is a block diagram of a first embodiment of an electronic ballast of the present invention.

FIG. 1 is a block diagram of an electronic ballast according to a first embodiment of the present invention. The ballast has a power supply or ballast circuit 1 for supplying electric power to a discharge lamp DL, a starting voltage generating circuit 2 for generating a high starting voltage to start discharge of the lamp DL, and a control circuit 3 for controlling the power supply circuit 1 and the starting voltage generating circuit 2. The control circuit 3 has a lighting detector circuit 31 for detecting whether or not the lamp DL is lighting. The control circuit may include logic so that the ballast switches, based on the result of detection by the lighting detector circuit 31, between a first operation period (starting mode) to operate the starting voltage generating circuit 2 to start discharge of the lamp DL and a second operation period (lighting mode) to maintain a steady arc discharge after the lamp DL has started. In the first operation period, the control circuit 3 controls the starting voltage generating circuit 2 to generate a high starting voltage. In the second operation period, the control circuit 3 controls the power supply circuit 1 so that the lamp 2 can have an output suitable for maintaining arc discharge.

The control circuit 3 may also have a starting voltage generating time count circuit 32 as a measurement circuit functional to measure operation information of the first operation period (starting mode). The control circuit 3 may include a comparison circuit 33 and a starting voltage generating circuit control circuit 34 as a circuit adapted to control the operation in the first operation period based on the result of measurement by the measurement circuit. The comparison circuit 33 compares the starting voltage generating time measured by the starting voltage generating time count circuit 32 with a predetermined time limit, and, when the measured time exceeds the predetermined time limit, causes the starting voltage generating circuit control circuit 34 to stop the operation of the starting voltage generating circuit 2.

The control circuit 3 may also have a lighting time count circuit 35 for measuring the duration of the second operation period when, in an operation process in which lamp discharge is started upon generation of a high starting voltage at the first-time start-up or restart, and a transition to arc discharge occurs, the lighting detector circuit 31 determines that the lamp DL is lighting and a shift to the second operation period is completed. When the duration of the second operation period reaches a predetermined reference time, reset circuit 36 resets the count value of the starting voltage generating time count circuit 32.

Figure 2:
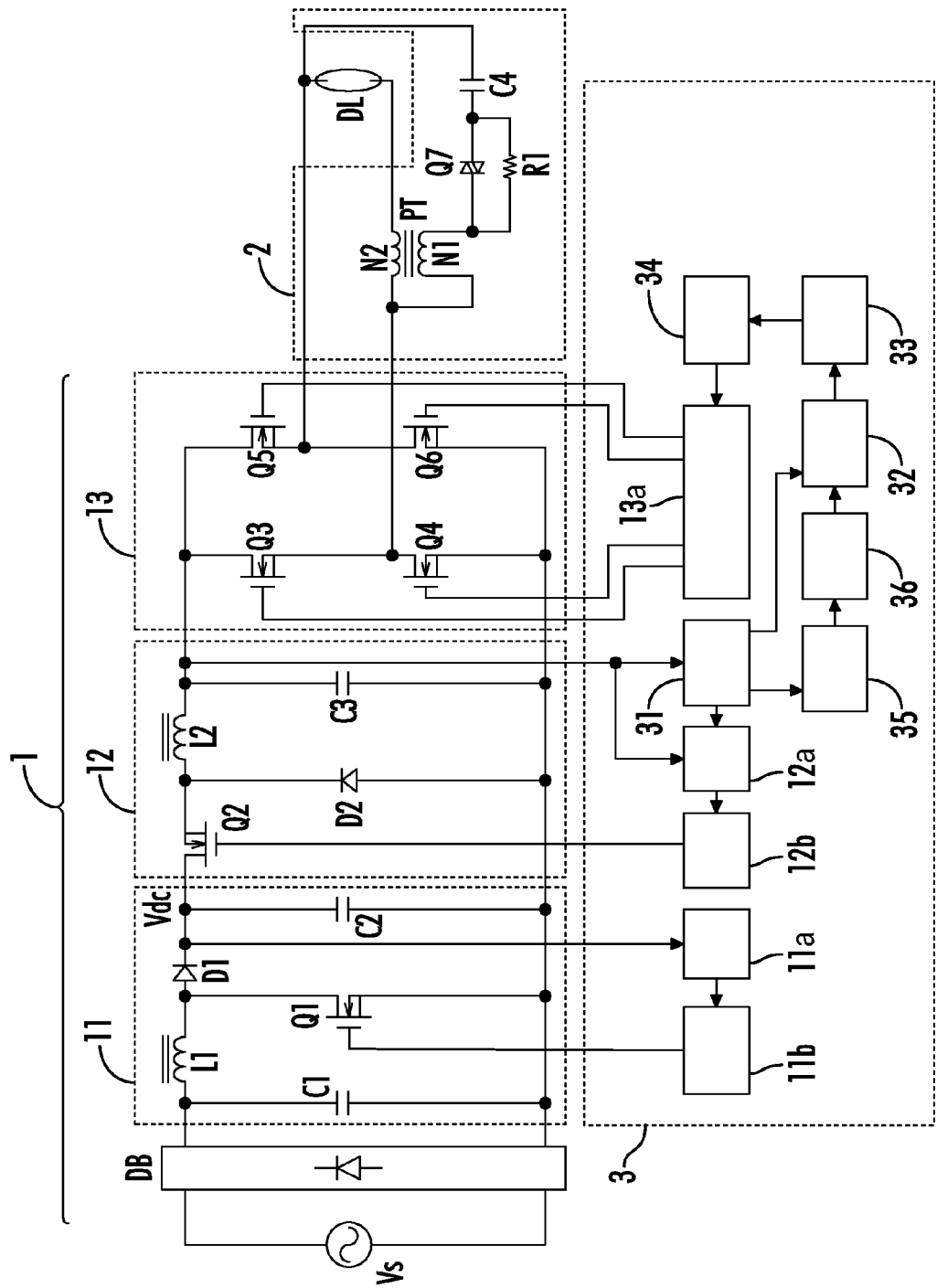
FIG. 2 is a circuit diagram of a first embodiment of the present invention.

FIG. 2 is a circuit diagram illustrating a specific circuit configuration of the embodiment of FIG. 1. The power supply or ballast circuit 1 includes a full-wave rectifying circuit DB, a step-up chopper circuit 11, a step-down chopper circuit 12, and an inverter circuit 13. The full-wave rectifying circuit DB can be a diode bridge circuit which is connected to a commercial AC power source Vs, rectifies the AC voltage from the commercial AC power source Vs, and outputs a pulsating DC voltage. The step-up chopper circuit 11 receives the voltage rectified by the full-wave rectifying circuit DB and outputs a stepped-up DC voltage Vdc. The step-down chopper circuit 12 is controlled so as to supply appropriate power to the lamp DL from the DC voltage Vdc as a power source. The inverter circuit 13 converts the DC output from the step-down chopper circuit 2 into a rectangular wave AC voltage and applies it to the lamp DL.

The circuit configuration of the step-up chopper circuit 11 is described below. Between the output terminals of the full-wave rectifying circuit DB, an input capacitor C1 is connected in parallel and a series circuit of an inductor L1 and a switching element or switch Q1 is connected. A smoothing capacitor C2 is connected across the switching element Q1 via a diode D1. The on and off of the switching element Q1 is controlled by a chopper control circuit 11b of the control circuit 3. The switching element Q1 is controlled to switch on and off at a frequency which is sufficiently higher than the frequency of the commercial AC power source Vs, so that the output voltage of the full-wave rectifying circuit DB is stepped up to a specified DC voltage Vdc and charged into the smoothing capacitor C2. A power factor improvement control may be performed so that a phase shift between the input current and input voltage from the commercial AC power source Vs does not occur. A filter circuit for blocking high-frequency signals may be provided at the AC input ends of the full-wave rectifying circuit DB.

The step-down chopper circuit 12 functions to supply target electric power to the lamp DL as a load. Also, the output voltage of the step-down chopper circuit 12 is variably controlled by the control circuit 3 so that appropriate power can be supplied to the lamp DL from start-up through an arc discharge transition period to a steady-state lighting period.

The circuit configuration of the step-down chopper circuit 12 is described below. A positive terminal of the smoothing capacitor C2 as a DC power source is connected to a positive terminal of a capacitor C3 via a switching element Q2 and an inductor L2. A negative terminal of the capacitor C3 is connected to a negative terminal of the smoothing capacitor C2. The anode of a regenerated-current passing or free-wheeling diode D2 is connected to the negative terminal of the capacitor C3. The cathode of the diode D2 is connected to the connection node between the switching element Q2 and the inductor L2.

The circuit operation of the step-down chopper circuit 12 is described below. The switching element Q2 is driven on and off at a high frequency by the output of a chopper control circuit 12b in the control circuit 3. Current flows from the smoothing capacitor C2 as a DC power source through the switching element Q2, the inductor L2, and the capacitor C3 when the switching element Q2 is on, and a regenerated current flows through the inductor L2, the capacitor C3, and the diode D2 when the switching element Q2 is off. A DC voltage stepped down from the DC voltage Vdc is thereby charged into the capacitor C3. The voltage that is obtained across the capacitor C3 can be variably controlled by varying the on-time (ratio of on-time in one cycle) of the switching element Q2 by the chopper control circuit 12b.

The inverter circuit 13 is connected to the output of the step-down chopper circuit 12. The inverter circuit 13 is a full-bridge circuit having four switching elements Q3 through Q6. A first pair of switching elements Q3 and Q6 and a second pair of switching elements Q4 and Q5 alternately are turned on at a low frequency with control signals from an inverter control circuit 13a, thereby converting the output power of the step-down chopper circuit 12 into rectangular wave AC electric power and supplying it to the lamp DL. The lamp DL as a load is a high-luminance lamp (HID lamp) such as a metal halide lamp or high-pressure mercury lamp.

The starting voltage generating circuit 2 includes a pulse transformer PT having a secondary winding N2 connected between the output of the inverter circuit 13 and the lamp DL, a voltage responsive switching element or diac Q7 which turns on when the voltage across it exceeds a predetermined value, and a capacitor C4 connected in series with the primary winding N1 of a pulse transformer T1 and the switching element Q7. A resistor R1 is connected in parallel with the switching element Q7 to charge the capacitor C4 when the switching element Q7 is off. In the starting voltage generating circuit 2, the capacitor C4 is charged via the primary winding N1 of the pulse transformer PT and the resistor R1. The sum of the output voltage of the inverter circuit 13 and the voltage Vc4 across the capacitor C4 is applied to the voltage responsive switching element Q7. The output voltage of the inverter circuit 13 is almost equal to the output voltage value Vc3 of the step-down chopper circuit 12. The switching element Q7 does not turn on when the rectangular wave voltage is stable because the voltage across the switching element Q7 is |Vc3|−|Vc4|, which is lower than the on-voltage of the switching element Q7.

However, when the polarity of the rectangular wave voltage is inverted, the voltage across the capacitor C4 is not varied rapidly because the capacitor C4 is charged via the resistor R1, and a voltage |Vc3|+|Vc4|, which is equal to or higher than the on-voltage of the switching element Q7, is applied to the switching element Q7 and the switching element Q7 is turned on. As a result, a pulsed current flows through the primary winding N1 of the pulse transformer T1 from the capacitors C3 and C4 as power sources. A voltage which is, according to the transformer turn ratio, higher than the voltage generated in the primary winding N1 is generated in the secondary winding N2 and applied to the lamp DL.

The control circuit 3 is next described. The step-up chopper circuit 11, the step-down chopper circuit 12, and the inverter circuit 13 described above are controlled by the control circuit 3 for proper operation. Also, to control the generation and interruption of a starting voltage by the starting voltage generating circuit 2, the control circuit 3 controls the step-down chopper circuit 12 and the inverter circuit 13.

The control circuit 3 has, as a circuit adapted to control the step-up chopper circuit 11, an output detector circuit 11a for detecting the output voltage Vdc of the step-up chopper circuit 11 and a chopper control circuit 11b for controlling the switching element Q1 so that the output voltage Vdc detected by the output detector circuit 11a can be a constant voltage.

The control circuit 3 also has, as a circuit adapted to control the step-down chopper circuit 12, an output detector circuit 12a for detecting the output voltage of the step-down chopper circuit 12, and a chopper control circuit 12b for controlling the switching element Q2 so that a predetermined output current corresponding to the output voltage detected by the output detector circuit 12a can be obtained. The step-down chopper circuit 12 is controlled so that appropriate power can be supplied to the lamp DL by these circuits.

The control circuit 3 also has, as a circuit adapted to control the inverter circuit 13, an inverter control circuit 13a for controlling the switching elements Q3 to Q6 of the inverter circuit 13.

In addition, the control circuit 3 has a lighting detector circuit 31 for detecting whether or not the lamp DL is lighting based on the output voltage of the step-down chopper circuit 12. A lighting time count circuit 35 measures the elapsed time after the lamp DL is lighted in response to the result of detection by the lighting detector circuit 31. A starting voltage generating time count circuit 32 measures the operation time of the starting voltage generating circuit 2. A comparison circuit 33 compares the operation time of the starting voltage generating circuit 2 measured by the starting voltage generating time count circuit 32 with a predetermined time limit. A starting voltage generating circuit control circuit 34 controls the operation and interruption of the starting voltage generating circuit 2 in response to the result from the comparison circuit 33. A reset circuit 36 is configured to reset the operation time of the starting voltage generating circuit 2 measured by the starting voltage generating time count circuit 32 when the lighting time measured by the lighting time count circuit 35 exceeds a predetermined reference time.

While the configuration of the control circuit 3 is illustrated in a functional block diagram in FIG. 2, the control circuit 3 may be partially or entirely implemented by analog or digital logic circuitry well-known in the art, and/or by a microprocessor with software that implements the functions of the control circuit 3.

Figure 3:
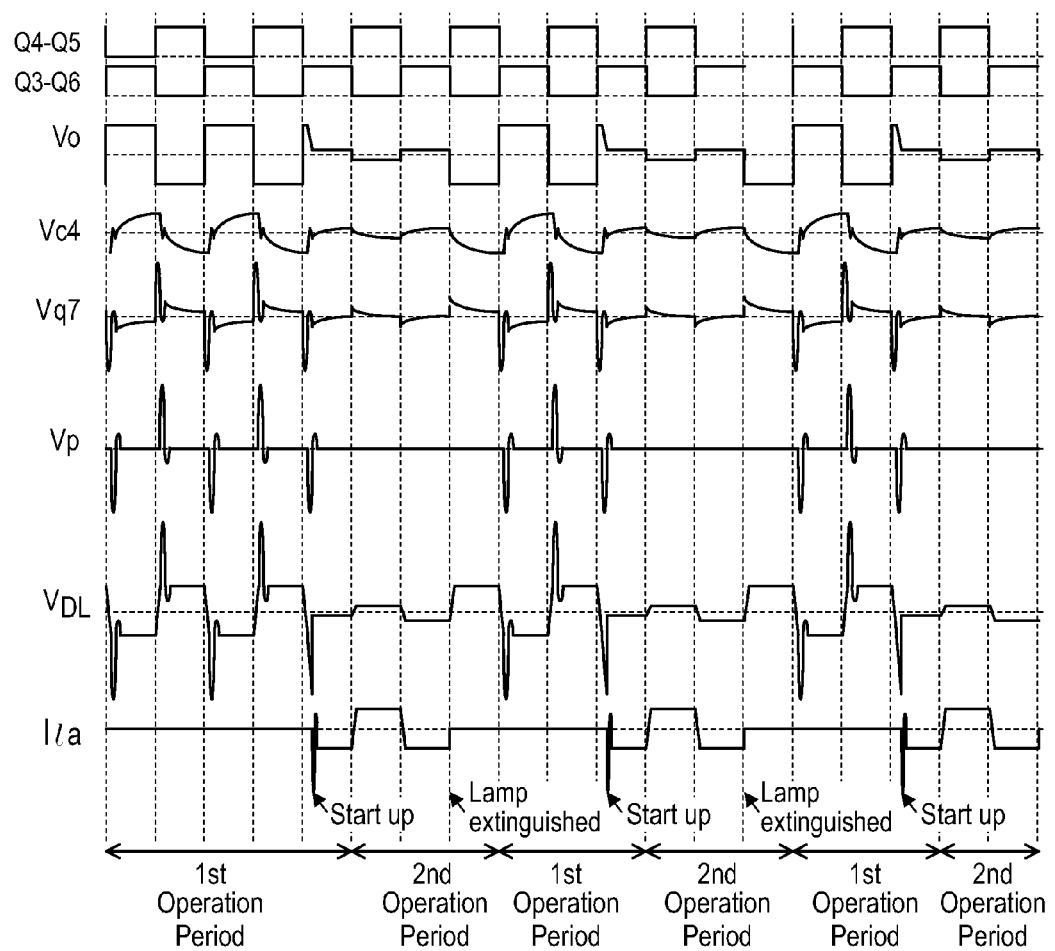
FIG. 3 is a chart showing operational waveforms of the first embodiment of the present invention.

FIG. 3 is a waveform chart illustrating operation of the embodiment of FIGS. 1 and 2. When the lamp DL is not lighting, as a first operation period to start the lamp DL, the step-down chopper circuit 12 outputs a DC voltage which is higher than the voltage which is output when the lamp DL is steadily lighting, and the inverter circuit 13 converts the DC voltage into a rectangular wave AC voltage and applies it to the lamp DL via the starting voltage generating circuit 2. After the lamp DL is started by the application of a high starting voltage, the process shifts to a second operation period to maintain a steady arc discharge. When the lamp DL is extinguished, the voltage across the lamp DL increases. When this voltage increase is detected and the lighting detector circuit 31 determines that the lamp DL is not lighting, the process returns to the first operation period.

Figure 4:
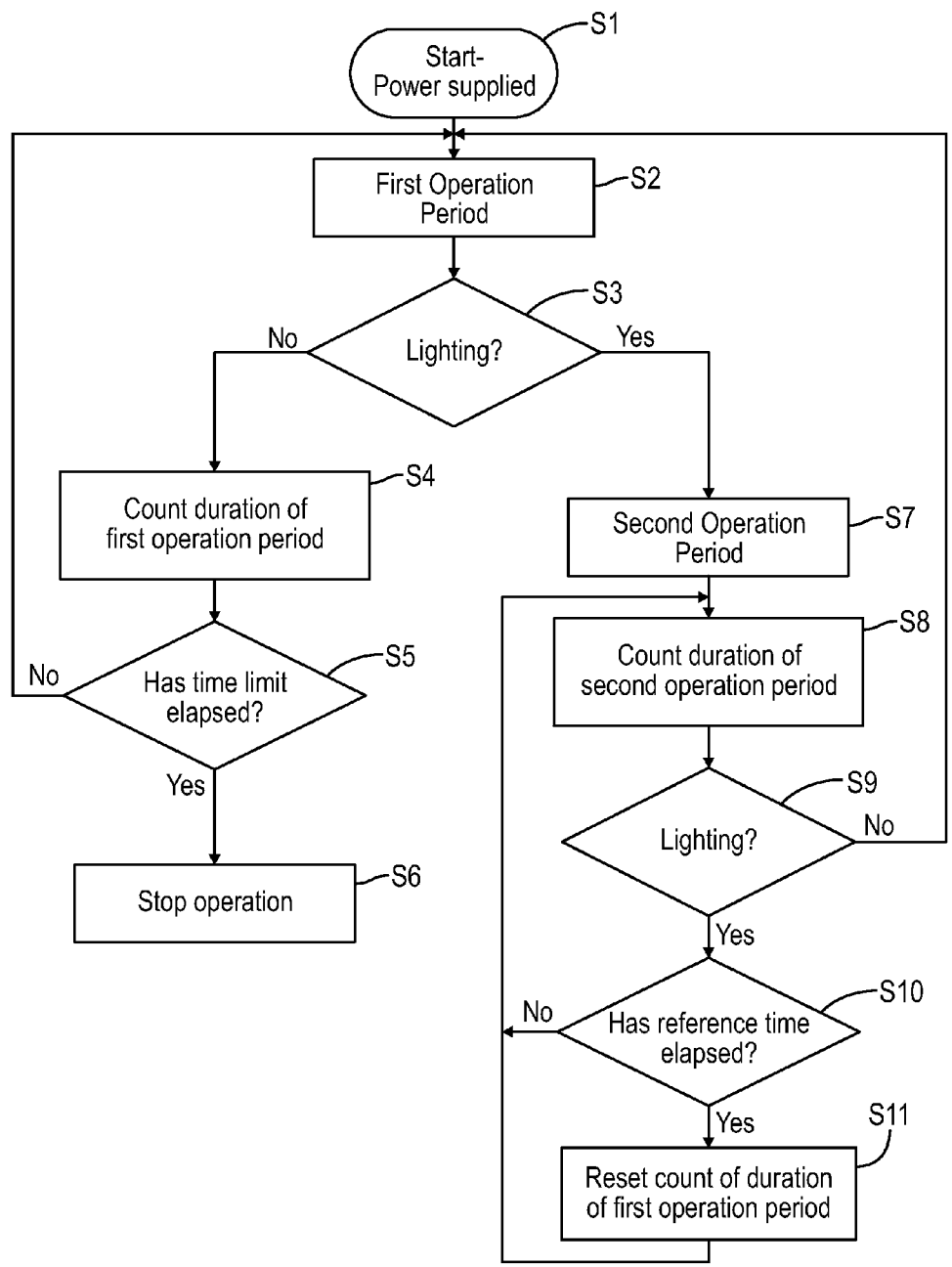
FIG. 4 is a flow chart of a ballast control method according to the first embodiment of the present invention.

FIG. 4 is a flow chart showing the ballast control method at start-up in this first embodiment. When power is turned on in Step 1 (S1), the first operation period (starting mode) is started in Step 2, and the lighting detector circuit 31 determines in Step 3 whether or not the lamp DL has been started. The starting voltage generating time count circuit 32 measures the time for which the high starting voltage is generated, from when the lamp DL is started until the lighting detector circuit 31 determines that the lamp DL is lighting (Step 4). When the lamp DL does not start for some reason, or the commercial power source is applied to the ballast with the lamp DL disconnected, the starting voltage generating circuit 2 continues to operate to generate the high starting voltage. At this time, the comparison circuit 33 compares the time for which the high starting voltage is generated with a predetermined time limit (Step 5). When the count value of the duration of the first operation period exceeds the predetermined time limit, a control signal is sent from the starting voltage generating circuit control circuit 34 to the inverter control circuit 13a so as to turn off the switching elements Q3 to Q6 of the inverter circuit 13 to stop the operation of the starting voltage generating circuit 2 by stopping the operation of the inverter circuit 13 (Step 6).

When the lamp DL is started, the lighting detector circuit 31 detects the fact that the lamp DL has been started (Step 3), and the process shifts to the second operation period to light the lamp DL in steady-state (Step 7). In the second operation period, the output detector circuit 12a detects the output voltage of the step-down chopper circuit 12, and the chopper control circuit 12b controls the operation of the step-down chopper circuit 12 so that a predetermined output current corresponding to the output voltage can be obtained, whereby rectangular wave shaped power is supplied to the lamp DL via the inverter circuit 13 to maintain steady lighting of the lamp DL.

The lighting time count circuit 35 counts the lighting time of the lamp DL in response to the detection, by the lighting detector circuit 31, that the lamp DL has been started (Step 8). When the lamp DL is extinguished in mid-operation, the process returns to Step 2 and resumes the first operation period (Step 9). When the lighting time of the lamp DL exceeds a predetermined reference time (Step 10), the time for which the high starting voltage is generated and which is measured by the starting voltage generating time count circuit 32 (the count value of the duration of the first operation period) is reset by the reset circuit 36 (Step 11).

Figure 5:
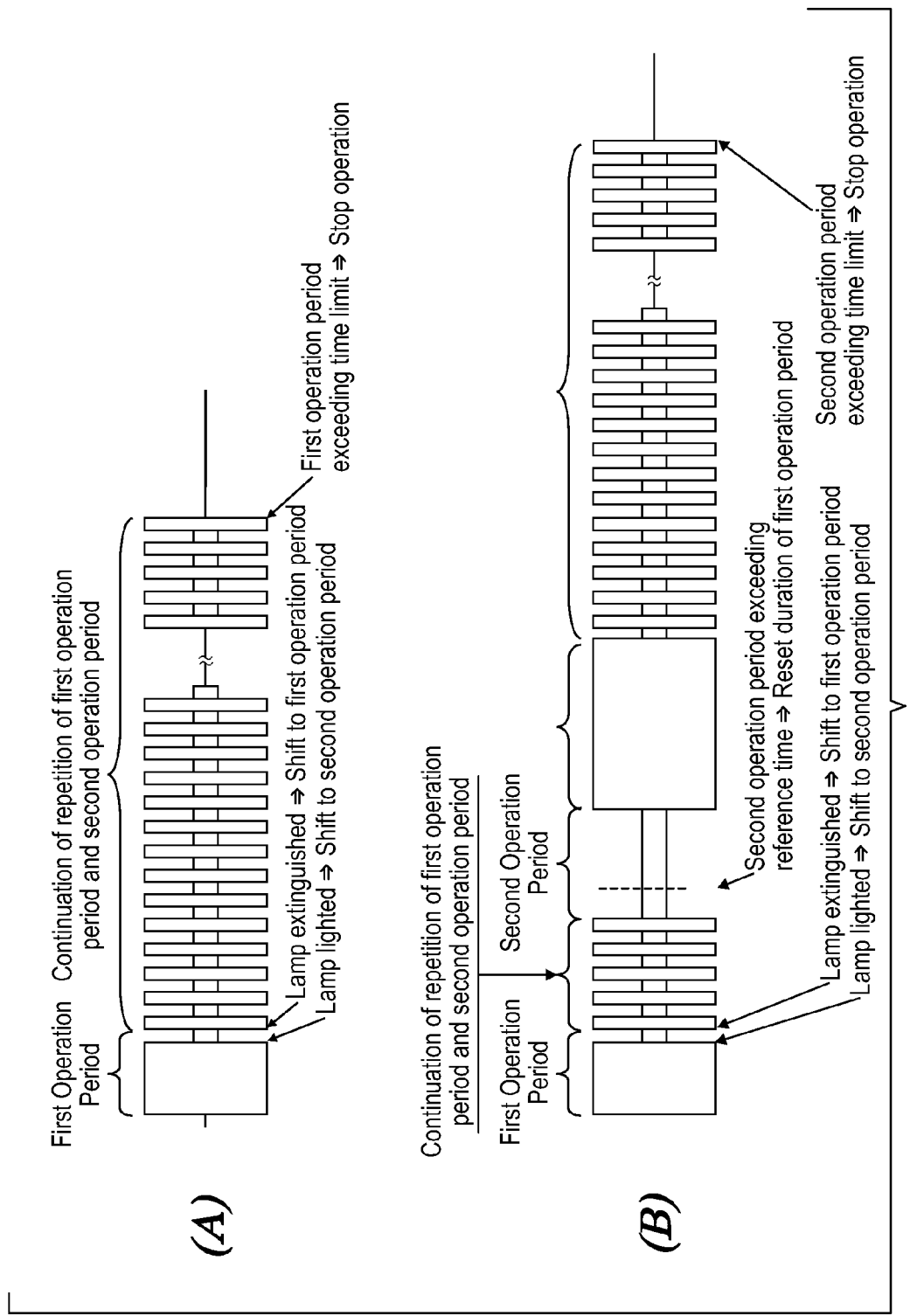
FIG. 5 is a diagram conceptually showing operation of the first embodiment of the present invention.

FIG. 5 is an explanatory diagram conceptually illustrating the operation at start-up in this embodiment. The horizontal axis represents the elapsed time after the start of the operation, and the vertical axis schematically represents the voltage envelopes across the lamp DL. FIG. 5(A) shows the operation in the case where an end-of-life lamp is connected. In this case, the lamp is started by the high starting voltage and an arc discharge is temporarily created but the second operation period does not continue beyond the reference time because steady discharge cannot be maintained. Then, the operation sequence of start-up, lighting, and extinguishing is repeated, with the measured generating time for which the high starting voltage is generated (the count value of the duration of the first operation) left un-reset. When the cumulative total of the high starting voltage generating time exceeds the time limit in the comparison circuit 33, the operation of the starting voltage generating circuit 2 is stopped and continuation of generation of a high starting voltage can be therefore prevented.

FIG. 5(B) shows the operation in the case where a normal lamp is connected. In the process of starting an ordinary normal lamp, a phenomenon such as lamp extinguishing or half-wave discharge (rectification) is also observed during the process of a transition from dielectric breakdown caused by the high starting voltage through glow discharge to arc discharge, but this does not last long. It can be therefore said that when an arc discharge is maintained for, for example, about 0.5 seconds and then the second operation period is continued, after the start-up of the lamp DL, the probability that the lamp is extinguished is low. Thus, when a steady arc discharge is maintained for a predetermined reference time (for 0.5 seconds or longer, for example), the reset circuit 36 resets the time measured by the starting voltage generating time count circuit 32. After that, even when the lamp DL is extinguished for some reason, the high starting voltage can be generated from the initial state as long as the reference time set in the comparison circuit 33 has elapsed. It is therefore possible to insure sufficient time for the high starting voltage to be generated in comparison with the time necessary to restart the lamp DL.

When the lamp DL is extinguished for some reason after it has been steadily lighted, it is necessary to generate a high starting voltage and apply the high starting voltage to the lamp DL to restart it. If the timing when the time measured by the starting voltage generating time count circuit 32 is reset is after the lamp DL has been operating sufficiently in a steady-state, the probability that the lamp DL is extinguished before the measured time is reset increases. In this case, it is impossible to insure sufficient starting voltage generating time at restart. Therefore, the reference time for use in determining whether or not to reset is preferably set to a value between about 0.5 seconds and about 30 seconds.

Figure 6:
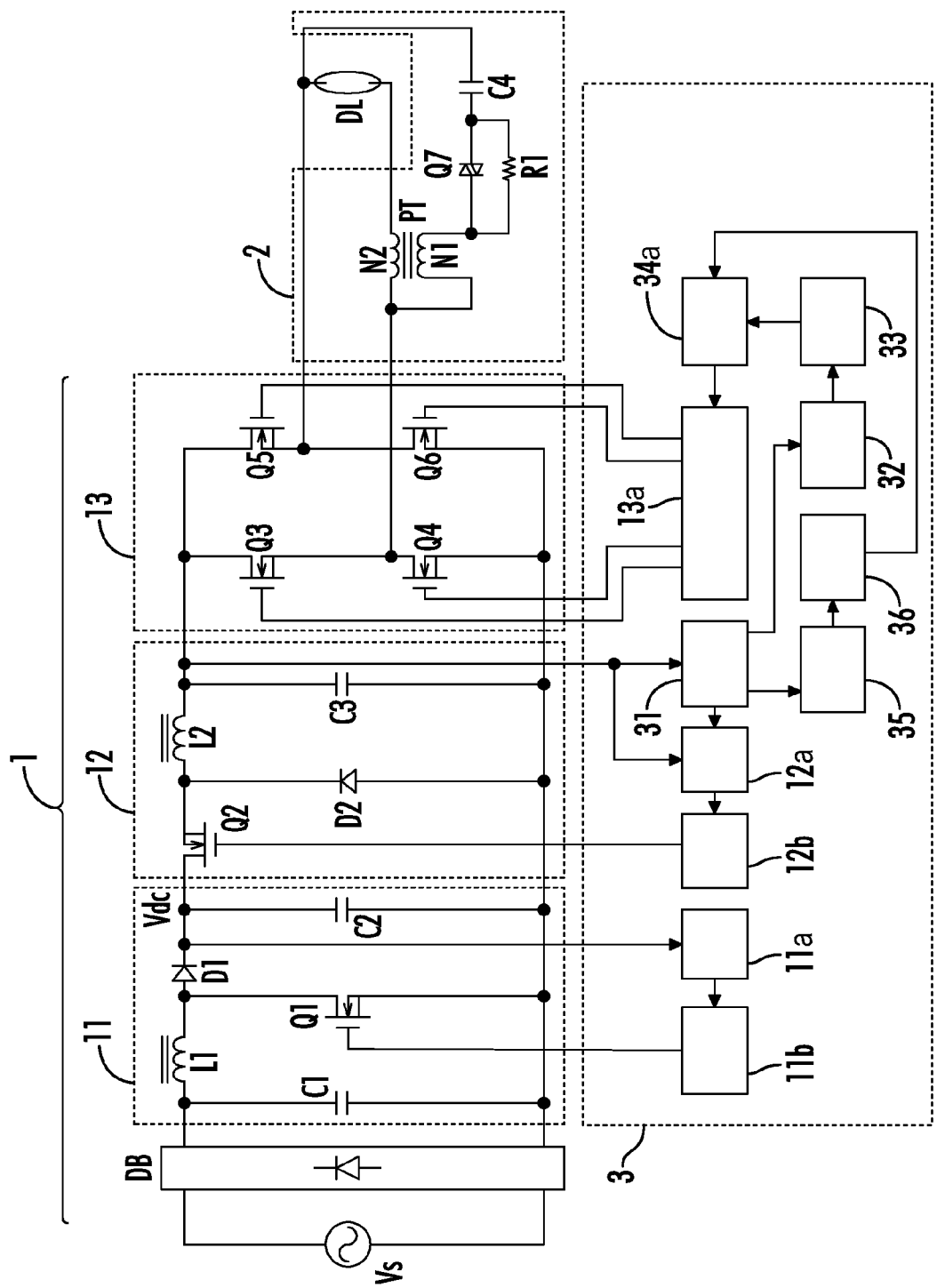
FIG. 6 is a circuit diagram of a second embodiment of the present invention.

FIG. 6 is a circuit diagram of a ballast according to a second embodiment of the present invention. The differences from the first embodiment are that a starting voltage intermittent timer 34a for intermittently generating a high starting voltage is provided as the starting voltage generating circuit control circuit 34 in FIG. 2. Also, the reset circuit 36 resets the count of the starting voltage intermittent timer 34a when the lighting time measured by the lighting time count circuit 35 exceeds a reference time. The other configurations and operations are the same as those of the first embodiment, and redundant explanation is therefore omitted.

Figure 7:
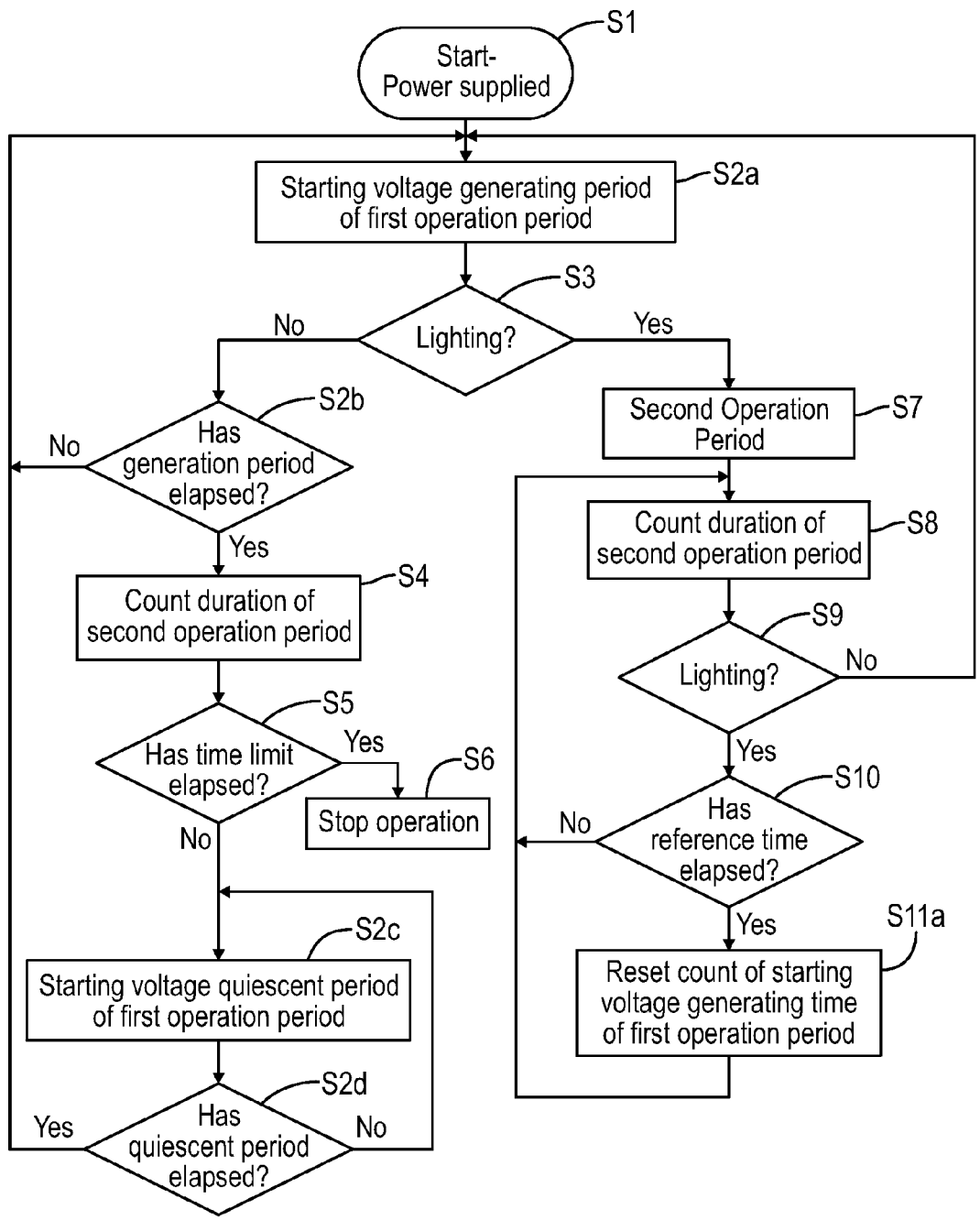
FIG. 7 is a flow chart showing a control method according to the second embodiment of the present invention.

FIG. 7 shows a flowchart of a control method for this second embodiment. The first operation period in the control method shown in FIG. 4 is divided into a starting voltage generating period and a starting voltage quiescent period by combining the controls in Step 2a (S2a) to Step 2d as the first operation period in Step 2. Also, when the second operation period has continued for a reference time or longer in Step 10, the count of the starting voltage generating period T1 in the first operation period is reset.

Figure 8:
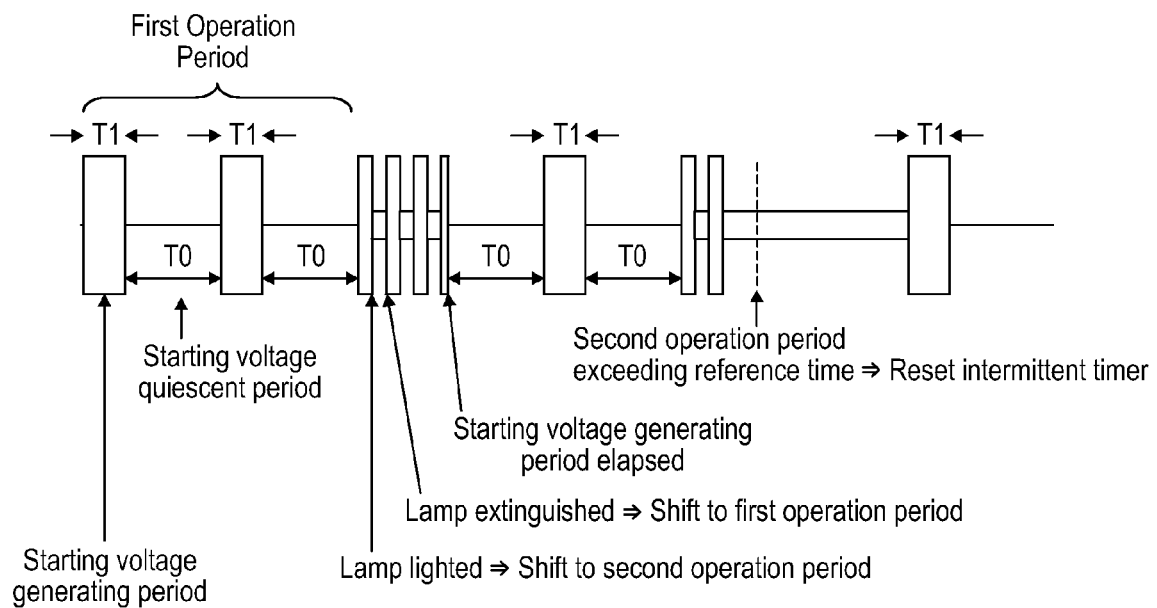
FIG. 8 is an explanatory diagram conceptually showing operation of the second embodiment of the present invention.

FIG. 8 shows a conceptual diagram of operation of this second embodiment. The horizontal axis represents the elapsed time after the start of the operation, and the vertical axis schematically represents the envelopes of the voltage between both ends of the lamp DL. In the first operation period to start the lamp DL, the starting voltage generating circuit 2 alternately repeats a starting voltage generating period T1 for which a high starting voltage is generated and a starting voltage quiescent period T0 for which the high starting voltage generating operation is interrupted, at intervals set by the starting voltage intermittent timer 34a as a starting voltage generating circuit control circuit.

Referring to the flowchart in FIG. 7, a starting voltage generating period is started in Step 2a, and, if the lamp DL is not lighting in Step 3, the starting voltage generating period is continued until the starting voltage generating period T1 has elapsed in Step 2*b*. After the starting voltage generating period T1 has elapsed, a starting voltage quiescent period is started in Step 2*c* when the duration of the first operation period is within the time limit in Step 4 to Step 6, and the starting voltage quiescent period is continued until the starting voltage interrupting period T0 elapses in Step 2*d*.

When the lamp DL is started by a high starting voltage generated during the starting voltage generating period T1, the lighting detector circuit 31 detects the fact that the lamp DL has been started (Step 3). Then, when the process shifts to the second operation period to light the lamp DL in steady-state (Step 7), the lighting time count circuit 35 starts measuring the lighting time (Step 8). When the lamp is extinguished before the lighting time exceeds the reference time, the process shifts to the first operation period again by the lighting detector circuit 31 and a high starting voltage is generated. Referring to the flowchart in FIG. 7, if it is determined that the lamp DL is not lighting in Step 9 before the reference time elapses in Step 10, the process returns to Step 2*a* and the starting voltage generating period of the first operation period is resumed. At this time, because the starting voltage intermittent timer 34*a* has not been reset, the count operation of the starting voltage generating period is resumed from a point in the middle of the starting voltage generating period described before.

In the case in which the lamp is extinguished before the lighting time exceeds the reference time repeatedly occurs, the process shifts to the starting voltage quiescent period when the total of the high starting voltage generating times reaches the starting voltage generating period of the starting voltage intermittent timer 34*a* (Step 2*b*), and the generation of a high starting voltage is interrupted (Step 2*c*). When the starting voltage quiescent period has elapsed (Step 2*d*), the process shifts to the starting voltage generating period again (Step 2*a*) and a high starting voltage is generated to start the lamp.

The reset circuit 36 resets the starting voltage intermittent timer 34*a* when the lighting operation is continued for a reference time or longer after the lamp has been started and a shift to the second operation period has been completed. Therefore, at restart in the event, for example, that the lamp DL is extinguished for some reason thereafter, an operation from an initial state is performed to ensure sufficient starting voltage generating period.

It should be noted that the operation of the starting voltage generating circuit 2 is stopped by terminating operation of the inverter circuit 13 when the count value of the duration of the first operation period exceeds a predetermined time limit as in the case of the first embodiment (Step 4 to Step 6).

As described above, because the temperature and pressure in the light-emitting tube of the lamp are high at restart after the lamp has been in a steady-state, the lamp is not restarted when a high starting voltage is applied immediately after extinguishing. As the temperature of the lamp decreases, the dielectric breakdown voltage gradually decreases, which enables the high starting voltage to cause a dielectric breakdown and in turn a glow discharge. When the temperature further decreases, after having a dielectric breakdown and a glow discharge caused by the high starting voltage, the lamp transitions to an arc discharging state and establishes a steady lighting state. During this process, the lamp may go out again after a brief transition to arc discharge.

The ballast is controlled so as to pass a predetermined current corresponding to the voltage of the lamp and supply appropriate power to insure a rapid transition to a steady lighting state when a transition to an arc discharging state occurs, but repeats the first operation period and the second operation period when the high pressure discharge lamp is extinguished again after a transition to the arc discharging state at restart.

If the operation information acquired during the starting process is unconditionally reset when a change of the lamp from a lighting state to a non-lighting state or vice versa is detected, a high starting voltage is applied from the initial state and a sequence of dielectric breakdown, glow discharge, arc discharge, extinguishing, and application of high starting voltage is continued every time the lamp is extinguished because the count operation of the starting voltage intermittent timer 34*a* is reset to the initial state every time the lamp is extinguished. As a result, the temperature of the lamp does not decrease, and a failure occurs in which restart takes longer than usual or restart cannot occur and a high starting voltage is continuously applied. In such a case, it is effective to decrease the temperature of the lamp DL by finishing the starting voltage generating period T1 earlier than when it is counted from the initial state and making a shift to the starting voltage quiescent period T0.

Figure 24:
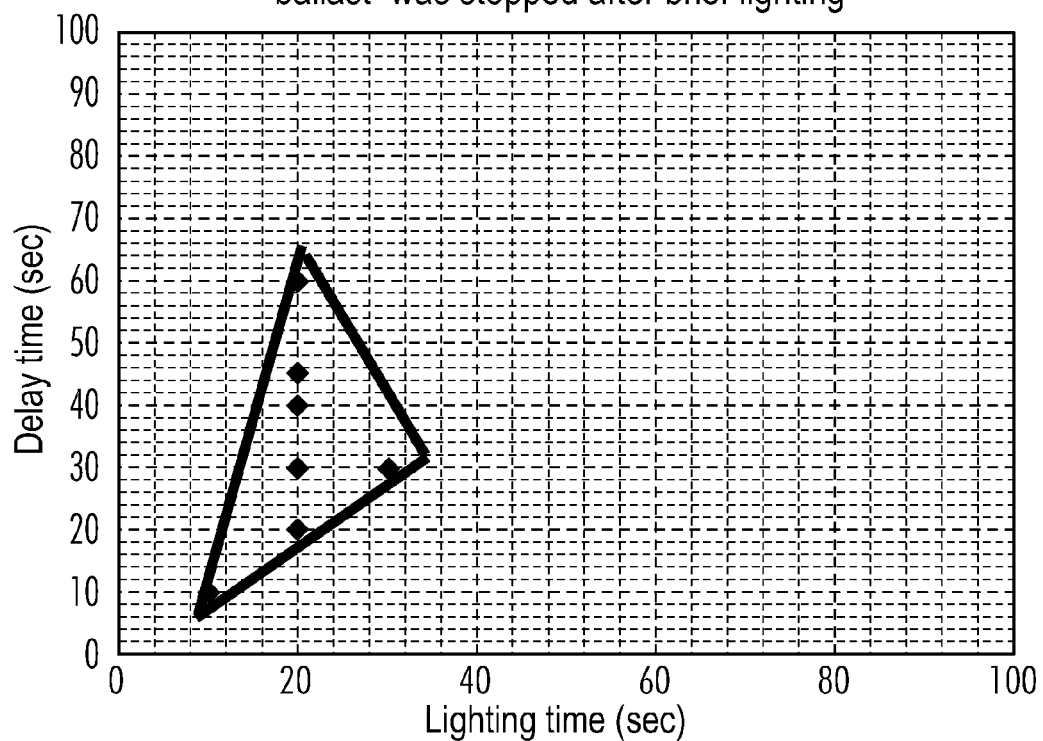
FIG. 24 is a characteristic diagram showing a characteristic of a lamp suitable for the present invention.

A certain type of lamp, when it is extinguished after it has been lighted for a short period of time before reaching a steady lighting state, falls into a state in which it cannot be easily started when power is turned on immediately after extinguishing. For example, FIG. 24 shows a result of investigation conducted to determine whether or not a high-color rendering and high-efficiency metal halide lamp can be restarted when it is extinguished after it has been lighted for a short period of time and power is turned on again after a certain period of time. As shown in FIG. 24, there is a region (a region enclosed by a triangle) in which the metal halide lamp fails to be restarted depending on the time for which the metal halide lamp has been extinguished when it is extinguished after it has been lighted for a short period of time of approximately 10 seconds to 30 seconds. This is a phenomenon that is observed especially with lamps containing a metal iodide. The high starting voltage causes amalgam, a mercury compound, or iodides to scatter and adhere to the vicinity of the tube wall around the electrodes, forming a path through which a discharge current passes easily along the tube wall and discharge is formed along the discharge path. Usually, lamp discharge continues, and the substances evaporate and a steady lighting state is established as the temperature and pressure in the light-emitting tube becomes higher. However, when the lamp is extinguished after it has been lighted for a short period of time and before the substances evaporate, the inside of the light-emitting tube of the lamp maintains an unsteady state and the substances tend to return gradually to the initial state. In this unsteady state, the lamp is started by the high starting voltage but the iodides consume the electrons necessary to form discharge and a mode in which the lamp is extinguished continues.

When such a state occurs, the lamp can be started easily when it is once extinguished and allowed to be inoperative for a predetermined period of time to restore it to an initial state. Specifically, control is effective in which the starting voltage intermittent timer 34*a* applies a starting voltage intermittently so that, when the lamp cannot be started during the starting voltage generating period T1, the application of a high starting voltage to the lamp is quiescent during the starting voltage interrupting period T0 as in this embodiment. However, when the starting voltage intermittent timer 34*a* is unconditionally reset when the lamp is extinguished after a shift to the second operation period, it takes a long time to make a shift to the starting voltage quiescent period T0 because start-up from an initial state is done at restart. Because a high starting voltage of the starting voltage generating period T1 is first applied and a cycle of dielectric breakdown, glow discharge, arc discharge, extinguishing, and application of high starting voltage is continued, the restart takes longer than usual. Thus, when the starting voltage intermittent timer 34a is reset when the second operation period has continued for a reference time or longer as in this embodiment, the starting voltage intermittent timer 34a is not reset when the second operation period has continued only for a short period of time. Therefore, at subsequent restart, start-up from an initial state is not done, and a shift to the starting voltage generating period can be made again after the lamp has become easy to restart through a brief starting voltage generating period and a sufficient starting voltage quiescent period. As a result, it is possible to restore the lamp to an initial state and make the lamp easy to start.

Figure 9:
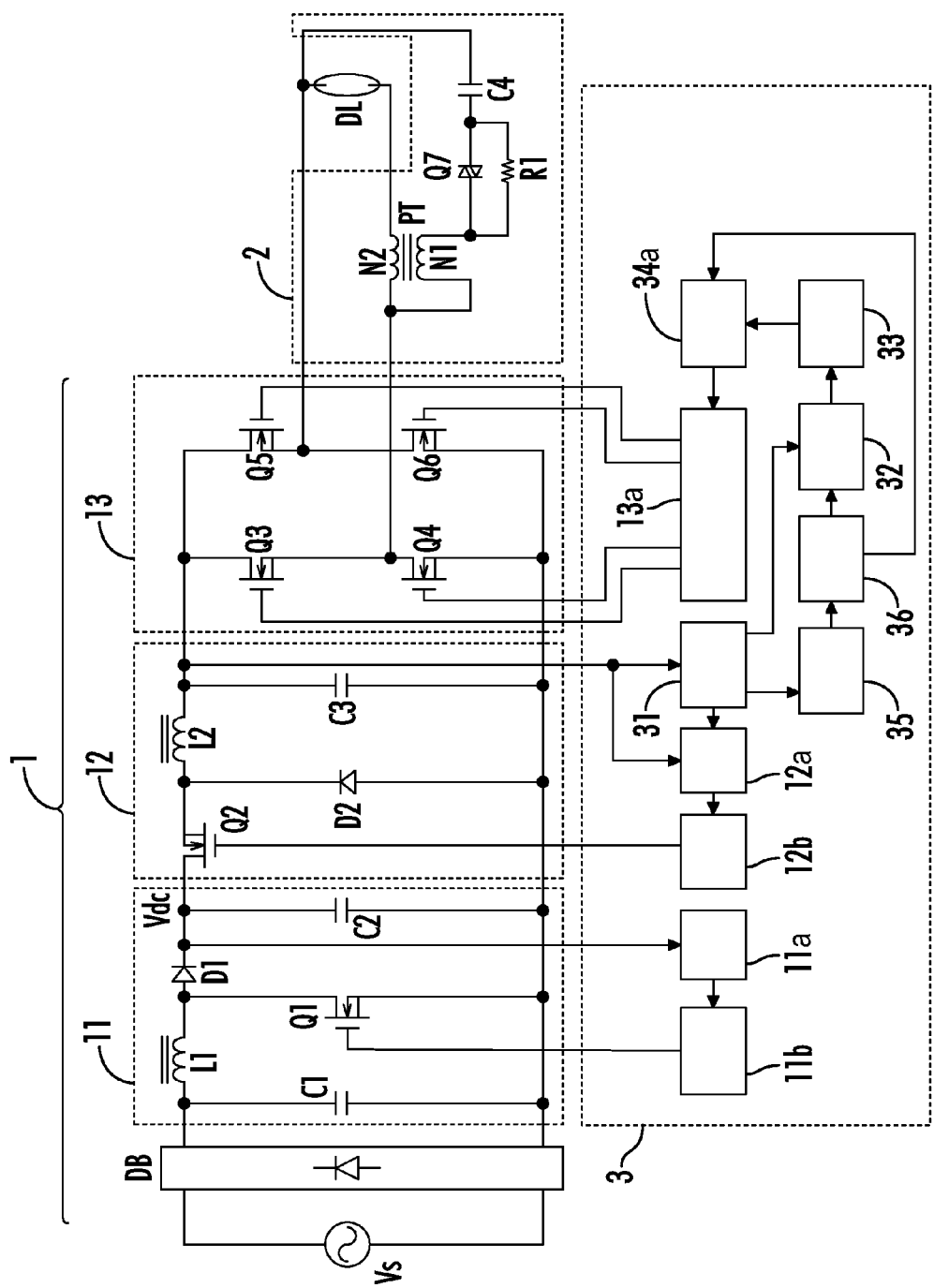
FIG. 9 is a circuit diagram illustrating a first modification of the second embodiment of the present invention.

FIG. 9 is a circuit diagram of a ballast according to a first modification of the second embodiment of the present invention. While it is the starting voltage intermittent timer 34a that is reset by the reset circuit 36 in FIG. 6, the count value of the duration of the first operation period measured by the starting voltage generating time count circuit 32 is simultaneously reset in the circuit shown in FIG. 9.

Figure 10:
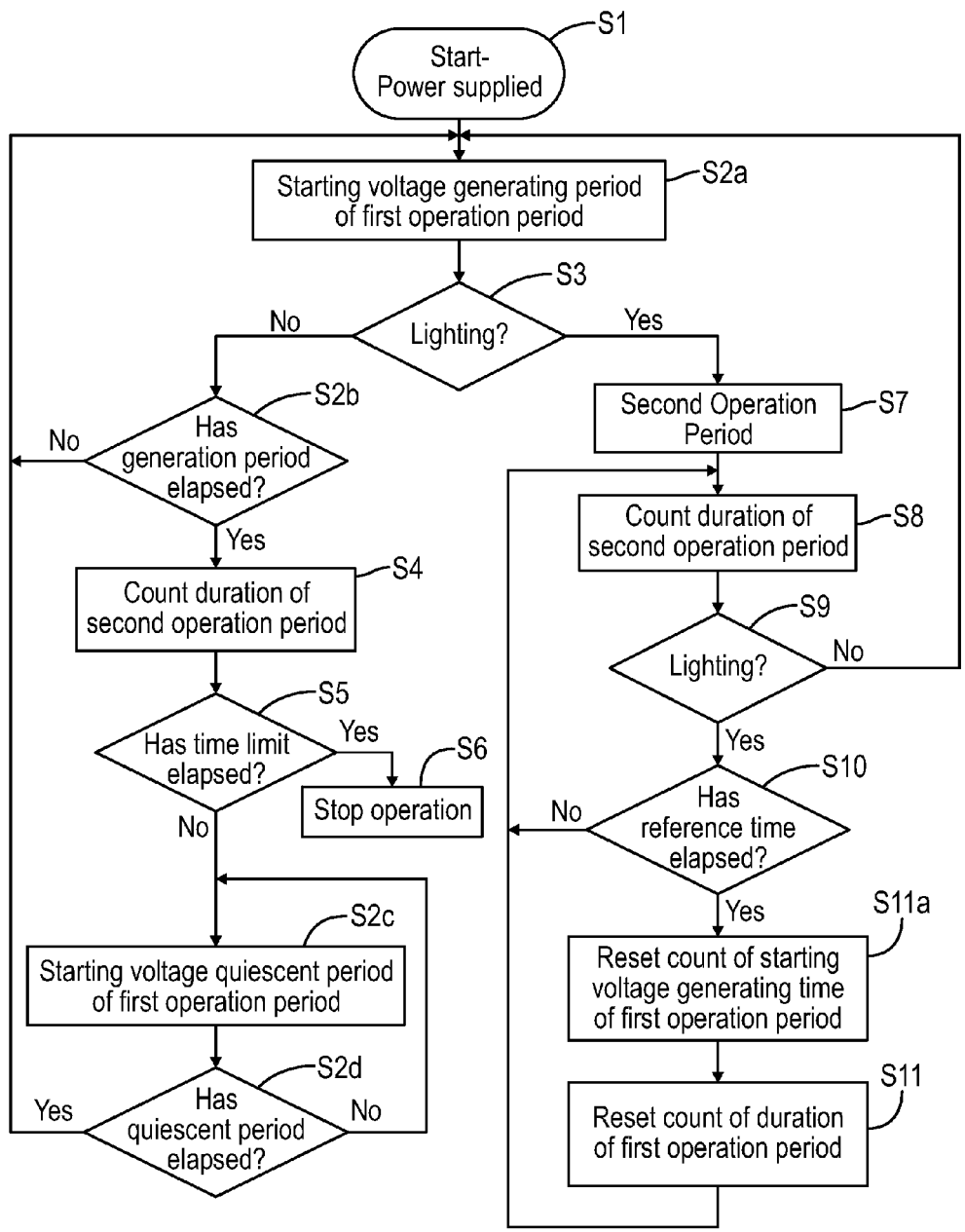
FIG. 10 is a flow chart showing a control method according to the embodiment of FIG. 9.

FIG. 10 shows a flowchart of a ballast control method for the modified embodiment of FIG. 9. In the control method shown in FIG. 10, when the second operation period has continued for a reference time or longer, the count of the starting voltage generating period in the first operation period is reset in Step 11a and the count of the duration of the first operation period is also reset at the same time in Step 11.

Figure 11:
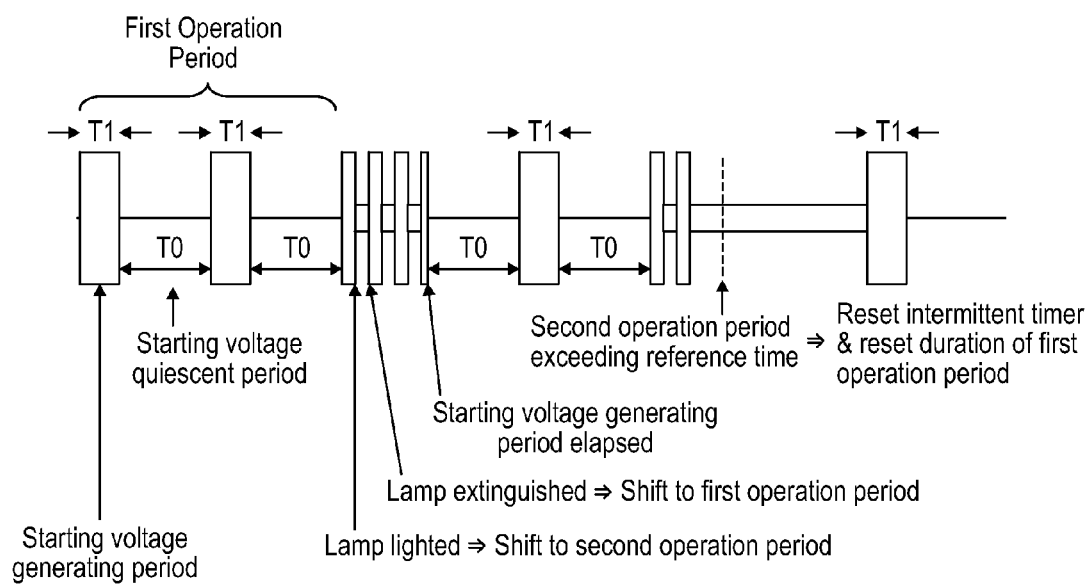
FIG. 11 is a diagram conceptually showing operation of the embodiment of FIGS. 9 and 10.

FIG. 11 shows a conceptual diagram of the operation of the modified embodiment of FIGS. 9 and 10. The horizontal axis represents the elapsed time after the start of the operation, and the vertical axis schematically represents the voltage envelopes across the lamp DL. In the operation shown in FIG. 11, the count value of the duration of the first operation period is also reset at the same time as the reset of the starting voltage intermittent timer 34a in the operation shown in FIG. 8.

When the count value of the duration of the first operation is simultaneously reset as described above, a sufficient high starting voltage generating time can be insured until the time limit in Step 5 elapses at restart of the lamp.

Figure 12:
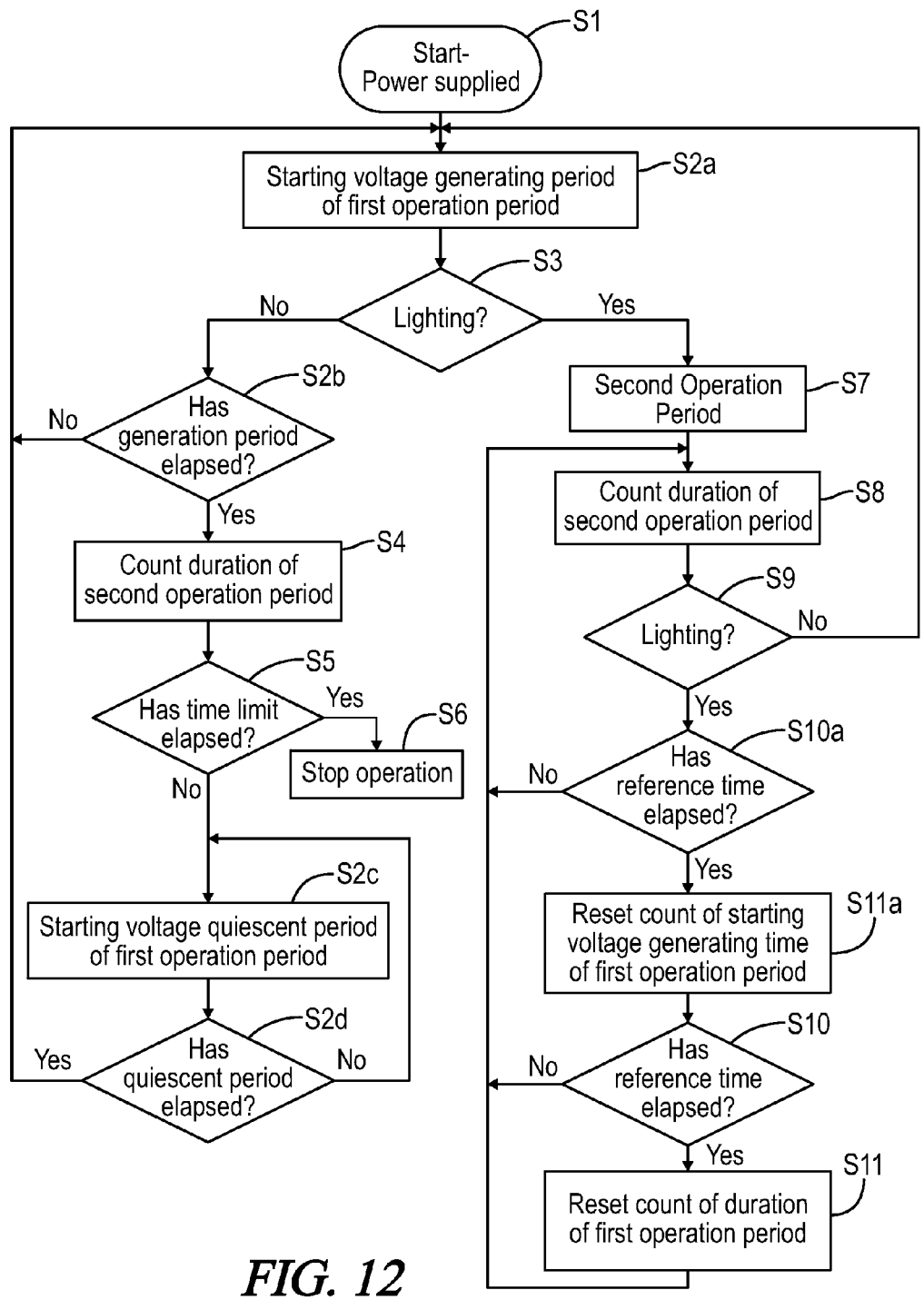
FIG. 12 is a flowchart showing a modified control method according to the embodiment of FIGS. 9-11.

FIG. 12 shows a flowchart of a control method of a second modification of the second embodiment of the present invention. In the control method shown in FIG. 12, the timing of resetting the count value of the starting voltage generating period in the first operation period (the count value for use in the determination in Step 2b) is different from the timing of resetting the count value of the duration of the first operation period (the count value for use in the determination in Step 5). The circuit configuration may be the same as that shown in FIG. 9.

Figure 13:
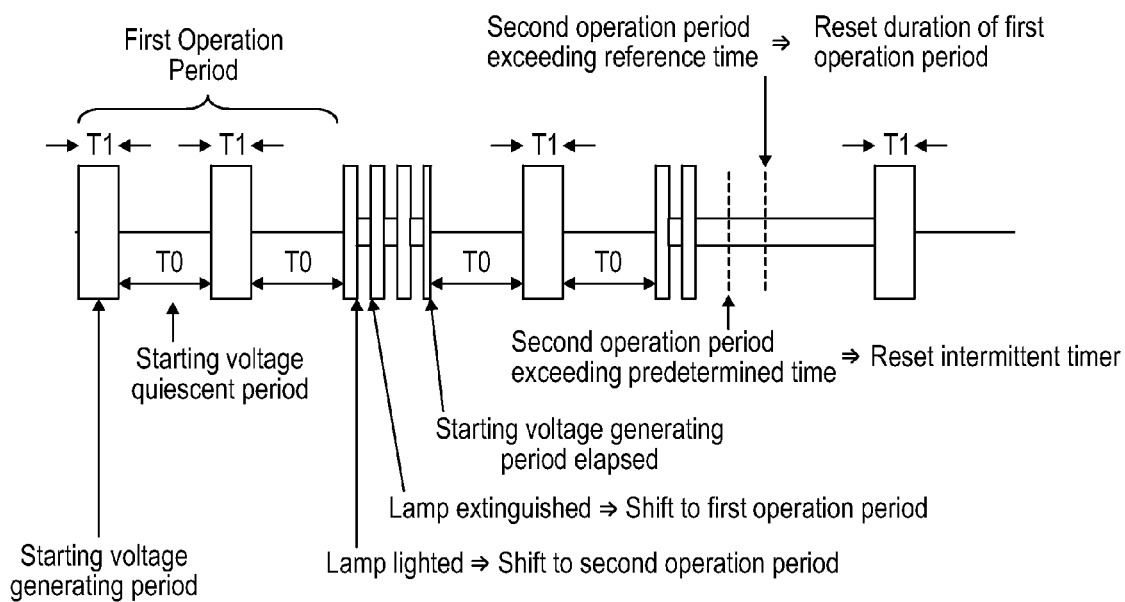
FIG. 13 is a diagram conceptually showing operation of the embodiment of FIGS. 9-12.

FIG. 13 shows a conceptual diagram of the operation of this second modified embodiment. The horizontal axis represents the elapsed time after the start of the operation, and the vertical axis schematically represents the envelopes of the voltage between both ends of the lamp DL. In the operation shown in FIG. 13, the timing of resetting the starting voltage intermittent timer 34a is separated from the timing of resetting the count value of the duration of the first operation period in the operation shown in FIG. 11. In other words, the starting voltage intermittent timer 34a is reset when the second operation period exceeds a predetermined time, and the count value of the duration of the first operation period is reset when the second operation period exceeds a reference time.

The terms "time limit in Step 5", "reference time in Step 10", and "predetermined time in Step 10a" are terms of convenience used to distinguish them and may be referred to instead as "first reference time", "second reference time", and "third reference time", respectively. The time limit in Step 5 is a time to limit the duration of the first operation period within the time beyond which it is considered undesirable for the first operation period to continue. The reference time in Step 10 is a reference time for use in determining whether to reset the count value of the duration of the first operation period. The predetermined time in Step 10a is a predetermined time suitable to reset the count value of the starting voltage generating period in the first operation period.

Figure 14:
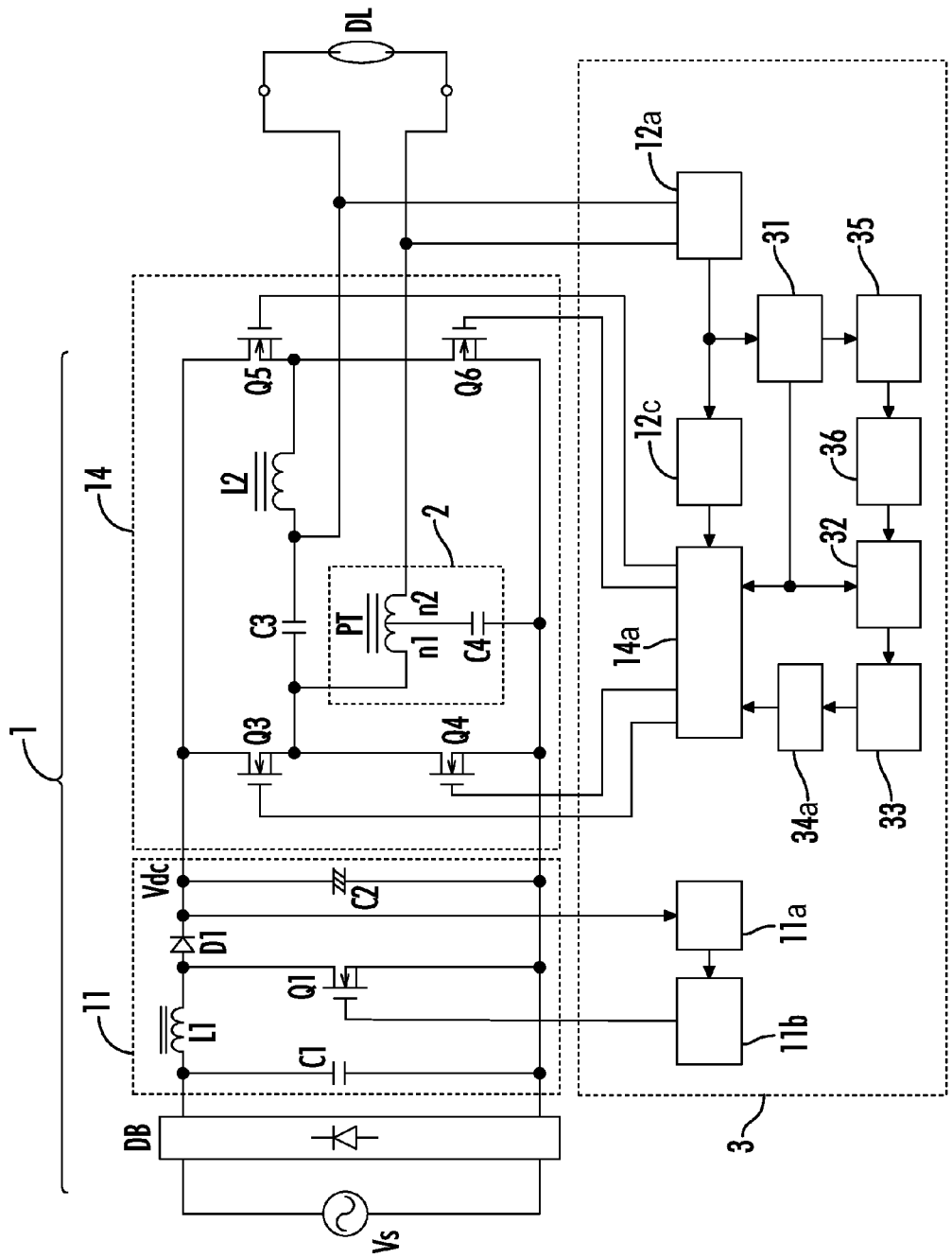
FIG. 14 is a circuit diagram illustrating a third embodiment of the present invention.

FIG. 14 is a circuit diagram of a ballast according to a third embodiment of the present invention. The differences from the first and second embodiments are that an inverter-type step-down chopper circuit 14, in which the step-down chopper circuit 12 and the inverter circuit 13 are integrated, is used in the ballast circuit 1, and that a resonant step-up circuit is used as the starting voltage generating circuit 2.

In the inverter-type step-down chopper circuit 14, a series circuit of the inductor L2 and the capacitor C3 that function as an output filter of the step-down chopper circuit, is connected between the connection node between switching elements Q3 and Q4 and the connection node between switching elements Q5 and Q6.

The starting voltage generating circuit 2 includes a resonant circuit formed of pulse transformer PT and capacitor C4, and generates a resonant step-up voltage for lamp start-up and restart that is applied to the lamp DL by the high-frequency switching operation of the switching elements Q3 to Q6 of the inverter-type step-down chopper circuit 14 using the DC voltage Vdc as a power source.

The control circuit 3 controls the switching element Q1 of the step-up chopper circuit 11 and the switching elements Q3 to Q6 of the inverter-type step-down chopper circuit 14. The control circuit 3 has a first output detector circuit 11a for detecting the output voltage Vdc of the step-up chopper circuit 11 and a chopper control circuit 11b for controlling the switching element Q1 based on the result of detection by the output detector circuit 11a. The control circuit 3 also has a second output detector circuit 12a for detecting the state of the lamp DL and a lighting detector circuit 31 for determining whether or not the lamp DL is lighting based on the result of detection by the second output detector circuit 12a.

An inverter output control circuit 14a switches the operation of the inverter-type step-down chopper circuit 14 based on a detection signal from the lighting detector circuit 31 between a first operation period (starting mode) to generate a high voltage to start the lamp DL and a second operation period (lighting mode) to light the lamp DL in steady-state. An arithmetic logic circuit 12c calculates the operation frequency and ON period of the switching elements Q5 and Q6 based on the voltage across the lamp DL detected by the output detector circuit 12a. The output of the arithmetic circuit 12c controls each of the switching elements Q3 to Q6 via the inverter output control circuit 14a during the second operation period. In the first operation period, a starting voltage generating period for which a high starting voltage is generated and a starting voltage quiescent period for which operation is interrupted are alternately repeated at intervals determined by the period of the starting voltage intermittent timer 34a.

The lighting time count circuit 35 measures the elapsed time after the lamp DL is lighted in response to the result of detection by the lighting detector circuit 31. The starting voltage generating time count circuit 32 measures the time for which the starting voltage generating circuit 2 generates a starting voltage in the first operation period. The comparison circuit 33 compares the operation time of the starting voltage generating circuit 2 measured by the starting voltage generating time count circuit 32 with a predetermined time limit. The starting voltage intermittent timer 34a controls the operation and interruption of the starting voltage generating circuit 2 in response to the comparison result from the comparison circuit 33. The reset circuit 36 resets at least the operation time of the starting voltage generating circuit 2 measured by the starting voltage generating time count circuit 32 when the lighting time measured by the lighting time count circuit 32 exceeds a predetermined reference time. The reset circuit 36 may simultaneously reset the starting voltage intermittent timer 34a.

Figure 15:
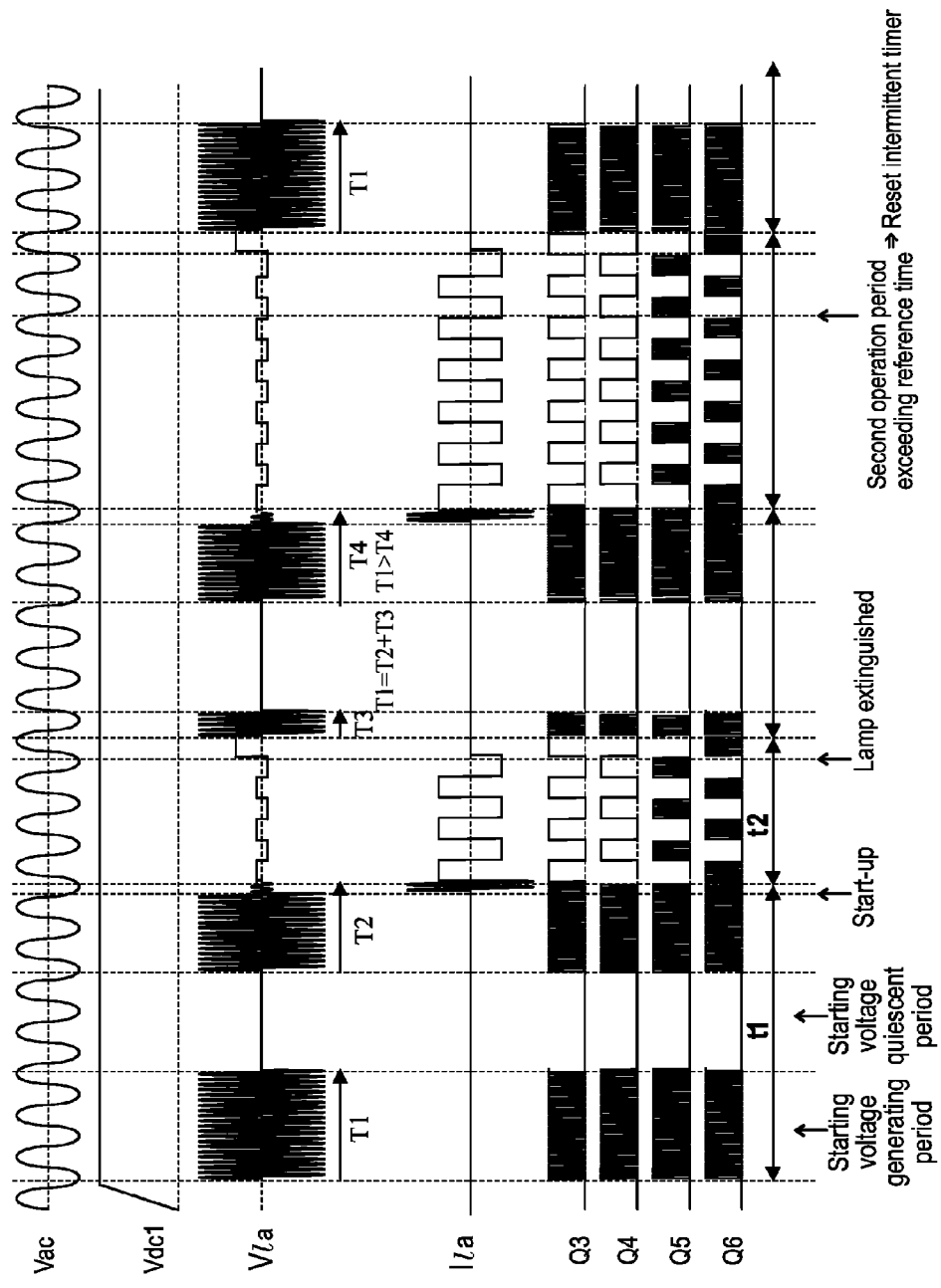
FIG. 15 is a waveform chart showing operational waveforms of the third embodiment of the present invention.

FIG. 15 is a waveform chart illustrating operation of the embodiment of FIG. 14. When the commercial AC power source Vs is applied, the control circuit 3 maintains the DC voltage Vdc at a predetermined constant value both during the lighting time when the lamp DL is lighting and the non-lighting time when the lamp DL is not lighting by turning on and off the switching element Q1 of the step-up chopper circuit 11 at approximately several dozen kHz and controlling the pulse width properly depending on the DC voltage Vdc. The step-up chopper circuit 11 also increases the input power factor from the commercial AC power source Vs to reduce input current distortion.

When the DC voltage Vdc reaches a predetermined value, the inverter-type step-down chopper circuit 14 starts operation. At this point, the lamp DL is in a non-lighting state, and the lamp DL is in the same state as its open state and in a high impedance state with the equivalent impedance thereof being nearly infinite. At this time, the inverter-type step-down chopper circuit 14 starts operation in the first operation period (starting mode) to start the lamp DL and alternately repeats a state in which the switching elements Q3 and Q6 are on and a state in which the switching elements Q4 and Q5 are on at a predetermined frequency f0 (approximately several hundred kHz). The frequency f0 is a frequency close to the resonant frequency fr of a series resonant circuit defined by primary winding n1 of the pulse transformer PT and the capacitor C4, where a sinusoidal wave-shaped high voltage is generated in the primary winding n1. The sinusoidal wave-shaped high voltage generated in the primary winding n1 is stepped up according to the turn ratio between the primary winding n1 and the secondary winding n2 of the pulse transformer PT and is applied to the lamp DL via the capacitor C3. As a result, the lamp DL undergoes dielectric breakdown and is started.

The starting voltage generating time count circuit 32 measures the time for which the high starting voltage is generated, from when the lamp DL is started until the lighting detector circuit 31 determines that the lamp DL is lighting. When the lamp DL is not started for some reason or the commercial power source is applied to the ballast with the lamp DL unconnected, the starting voltage generating circuit 2 continues operation and a high starting voltage continues to be generated. However, when the comparison circuit 33 compares the high starting voltage generating time with a predetermined time limit and the high starting voltage generating time exceeds the time limit, the starting voltage intermittent timer 34a is stopped, and a control signal is sent to the inverter output control circuit 14a so as to turn off the switching elements Q3 to Q6 to stop the operation of the starting voltage generating circuit 2 by stopping the operation of the inverter-type step-down chopper circuit 14.

When the lamp DL is started by the high starting voltage generated during the starting voltage generating period, the lamp DL changes to a low impedance state close to short circuit, and the voltage across the lamp DL decreases to almost 0 V. When the voltage across the lamp DL falls below a lighting detection voltage threshold value, the lighting detector circuit 31 determines that the lamp DL has lighted and its detection signal is input into the arithmetic circuit 12c. In response to the signal, the arithmetic circuit 12c switches operation of the inverter-type step-down chopper circuit 14 to the second operation period (lighting mode) to light the lamp DL steadily.

In the second operation period (lighting mode), the inverter-type step-down chopper circuit 14 repeats an operation in which the switching elements Q3 and Q4 are alternately turned on and off at a predetermined frequency fa (approximately about several hundred kHz). At this time, the switching element Q6 is turned on and off at a predetermined frequency fb (approximately several dozen kHz) during the period when the switching element Q3 is on and the switching element Q5 is turned on and off at the predetermined frequency fb (approximately several dozen kHz) during the period when the switching element Q4 is on. By the polarity inverting step-down chopper operation, a rectangular wave AC voltage with the frequency fa is applied to the lamp DL. At this time, the capacitor C3 and the inductor L2 function as a filter circuit of the step-down chopper circuit, and anti-parallel diodes in the switching elements Q5 and Q6 function as regenerated current passing diodes for the step-down chopper circuit.

The voltage across the lamp DL is low immediately after start-up but, as the temperature and pressure in the light-emitting tube increases, the voltage across the lamp increases to a rated value and the lamp DL lamp changes to a steady lighting state. In the control circuit 3, the output detector circuit 12a detects the state of the lamp DL, and the arithmetic circuit 12c properly controls the chopping frequency and on-period of the switching elements Q5 and Q6 based on the voltage across of the lamp DL so that appropriate power can be supplied to light the lamp DL steadily.

In the first operation period to start the lamp DL, the starting voltage generating circuit 2 repeats a starting voltage generating period for which a high starting voltage is generated and a starting voltage quiescent period for which the operation is interrupted alternately at intervals of the period of the starting voltage intermittent timer 34a. When the lamp DL is started by the high starting voltage generated during the starting voltage generating period, the operation shifts to the second operation period to light the lamp DL steadily with the lighting detector circuit 31, and the lighting time count circuit 35 starts measuring the lighting time. When the lamp DL is extinguished before the lighting time exceeds a reference time, the inverter output control circuit 14a, in response to the detection result from the lighting detector circuit 31, shifts again to the first operation period and generates a high starting voltage. At this time, because the starting voltage intermittent timer 34a has not been reset, the operation is resumed from a point in the middle of the starting voltage generating period described above.

Referring to the example shown in FIG. 15, the lamp DL is not started in the first starting voltage generating period T1 and the operation shifts to the starting voltage quiescent period. In the next starting voltage generating period T2, the lamp DL is started and the operation shifts to the second operation period. However, because the lamp DL is extinguished before the reference time elapses, the operation shifts to the first operation period again with the starting voltage intermittent timer 34a left un-reset. In this case, the starting voltage intermittent timer 34a starts operation at a point in the middle of the previous starting voltage generating period, and the operation immediately shifts to a starting voltage quiescent period through a brief starting voltage generating period T3 (=T1−T2). In other words, in the case where the lamp is extinguished before the lighting time exceeds the reference time repeatedly occurs, when the total of the high starting voltage generating times reaches the starting voltage generating period of the starting voltage intermittent timer 34a, the operation shifts to the starting voltage quiescent period and generation of a high starting voltage is interrupted. The temperature of the light-emitting tube of the lamp DL decreases during the quiescent period and the lamp DL becomes easily started. Thus, even a lamp having characteristics shown in FIG. 24 has a lower probability of failing to be started by restoring the inside of the light-emitting tube to an initial state.

When the starting voltage quiescent period has elapsed, the operation shifts to the starting voltage generating period again, and a high starting voltage is generated to start the lamp. In the next starting voltage generating period T4, the lamp DL is started and the operation shifts to the second operation period. At this time, because the lamp DL is started in the stage where T4<T1, the starting voltage generating period of the starting voltage intermittent timer 34a still has a value (T1−T4) to count. However, when the second operation period continues for a longer period of time and the reference time has elapsed before the lamp DL is extinguished, the starting voltage intermittent timer 34a is immediately reset. That is, because the reset circuit 36 resets the starting voltage generating time measured by the starting voltage generating time count circuit 32 and the starting voltage intermittent timer 34a when a reference time elapses after the lamp has been started and the operation has shifted to the second operation period, the operation is started from an initial state and a sufficient starting voltage generating period can be insured at restart in the case where the lamp is extinguished for some reason. When the lamp DL is extinguished in this stage, the next starting voltage generating period does not have a length (T1−T4) which is counted from the point in the middle of the period, but continues over the period T1 at maximum.

It should be noted that when the starting voltage generating time measured by the starting voltage generating time count circuit 32 exceeds the time limit set in the comparison circuit 33, the operation of the starting voltage intermittent timer 34a is stopped and the generation of the high starting voltage from the starting voltage generating circuit 2 is stopped to prevent continuous generation of the high starting voltage as in the second embodiment. The control flow of this embodiment may be same as that shown in FIG. 10.

It should be noted that the starting voltage generating circuit using the inverter-type step-down chopper circuit and the resonant step-up circuit as described in this embodiment may be also used in other embodiments.

Figure 16:
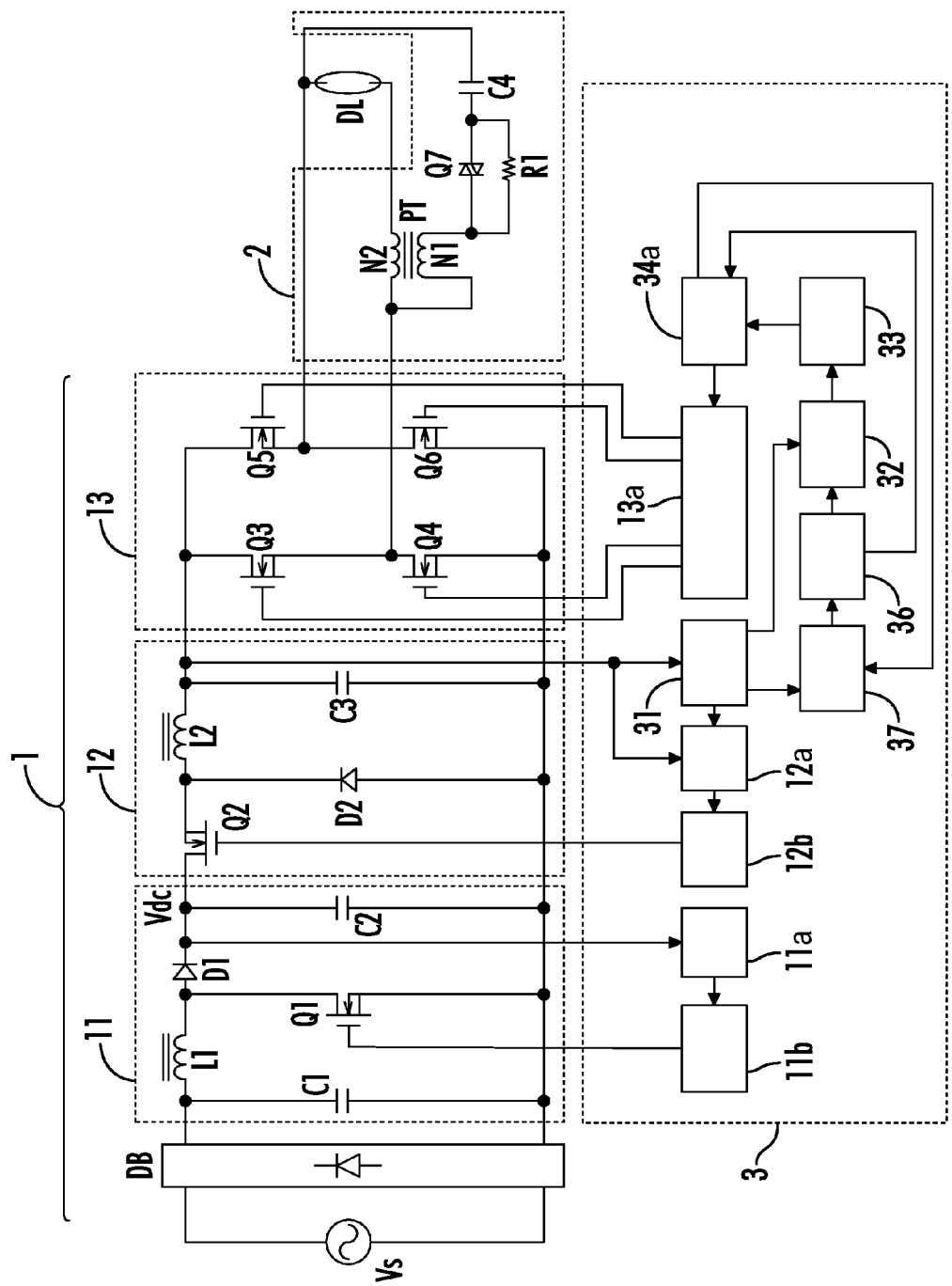
FIG. 16 is a circuit diagram illustrating a fourth embodiment of the present invention.

FIG. 16 is a circuit diagram of a ballast according to a fourth embodiment of the present invention. The differences from the second embodiment described above are that the lighting time count circuit 35 is omitted, and that the time-measuring state of the starting voltage generating period in the starting voltage intermittent timer 34a is monitored by a determination circuit 37 instead, and the second operation period is regarded as having been continued for a reference time or longer when the result of detection by the lighting detector circuit 31 is "lighting" at the end of the starting voltage generating period.

Figure 17:
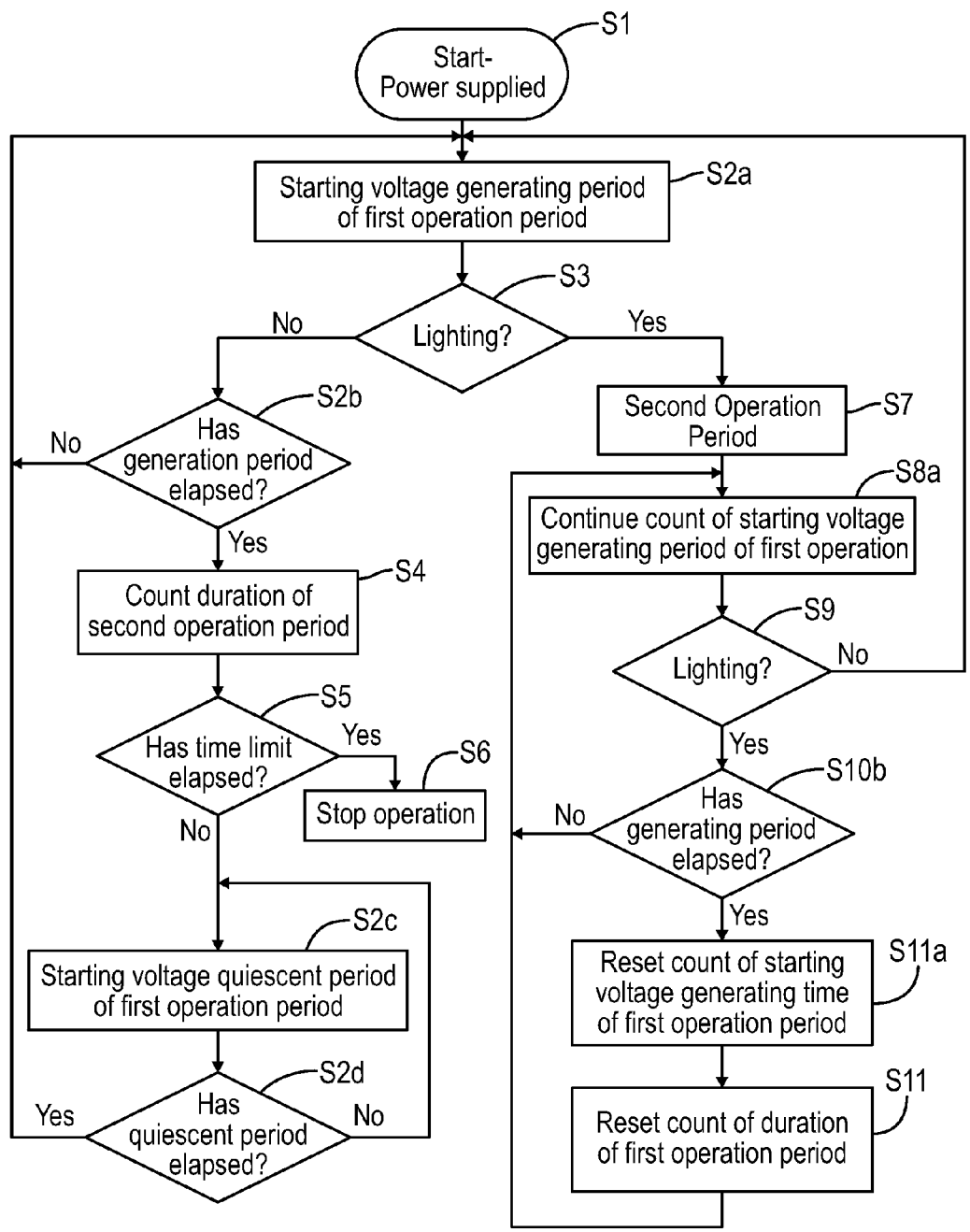
FIG. 17 is a flow chart showing a ballast control method according to the fourth embodiment of the present invention.

FIG. 17 shows a flowchart of a control method according to embodiment of FIG. 16. Step 8 and Step 10 in FIG. 10 are replaced by Step 8a (S8a) and by Step 10b in FIG. 17. First, instead of counting the duration of the second operation period in Step 8 in FIG. 10, counting the starting voltage generating period in the first operation period is continued in Step 8a in FIG. 17. In addition, instead of determining whether or not the duration of the second operation period has exceeded a reference time in Step 10 in FIG. 10, it is determined whether or not the starting voltage generating period in the first operation period has elapsed in Step 10b in FIG. 17. The other operations are the same as those in the method of FIG. 10, and when the starting voltage generating period in the first operation period has elapsed, the count of the starting voltage generating period in the first operation period is reset in Step 11a, and the count of the duration of the first operation period is simultaneously reset in Step 11.

Figure 18:
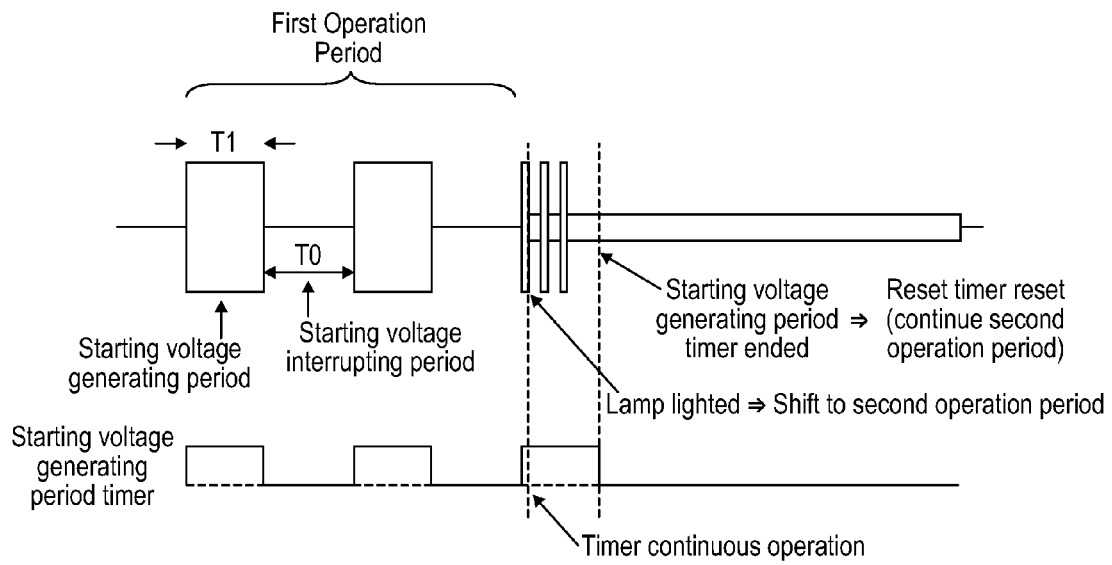
FIG. 18 is a diagram conceptually showing operation of the fourth embodiment of the present invention.

FIG. 18 shows a conceptual diagram of operation of the embodiment of FIGS. 16 and 17. The operation of the starting voltage generating period timer in the starting voltage intermittent timer 34a and the voltage across the lamp DL are schematically shown. The lamp is started by a high starting voltage generated during the starting voltage generating period in the first operation period, and the count operation of the starting voltage intermittent timer is continued even after the shift to the second operation period has been completed. When the time corresponding to the starting voltage generating period is ended, the determination circuit 37 reads the result of detection from the lighting detector circuit 31. When the lamp is lighting and the second operation period has been continued at this point, the starting voltage intermittent timer 34a and the starting voltage generating time count circuit 32 are reset. Alternatively, only one of them may be reset.

When the lamp is not started for some reason or the commercial power source is applied to the ballast with the lamp disconnected, the starting voltage generating period and the starting voltage quiescent period are repeated according to the starting voltage intermittent timer 34a, and the first operation period is continued, as in the case of the second embodiment described above. When the comparison circuit 33 determines that the duration of the first operation period measured by the starting voltage generating time count circuit 32 reaches a time limit, the operation of the starting voltage generating circuit 2 is stopped (Step 5, Step 6).

This fourth embodiment does not require the lighting time count circuit 35 for measuring the lighting time after the lamp has been started and a shift to the second operation period has been completed. This embodiment is simple in configuration, but can prevent the generation of an unnecessary high starting voltage and insure safety even when an end-of-life lamp fails to be started and can provide a normal lamp with reliable starting and restarting characteristics.

Although a device having a full-bridge configuration as the ballast circuit 1 is shown in the embodiments described in the foregoing, it is apparent that the present invention is not limited thereto and a half bridge configuration or other configurations can also be used. As for the starting voltage generating circuit 2, although a configuration in which a resonant step-up circuit is driven at a high frequency (FIG. 14) and a configuration using the voltage responsive switching element Q7 which generates starting pulses (FIG. 2, etc.) are shown, it is apparent that the present invention is not limited to these configurations and may use a configuration which generates starting pulses at arbitrary timings. For example, when a starting voltage generating circuit having a configuration in which a switching element having a control electrode is connected in series with the primary winding of a pulse transformer and a charge accumulating capacitor is used, starting pulses can be generated at times when pulse signals are input into the control electrode.

Figure 19:
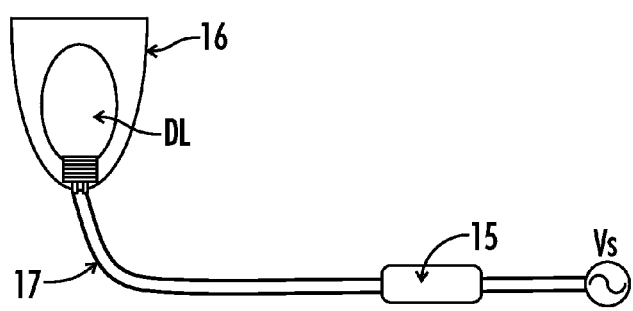
FIG. 19 is a schematic diagram of a lamp fixture using a ballast of the present invention.
Figure 20:
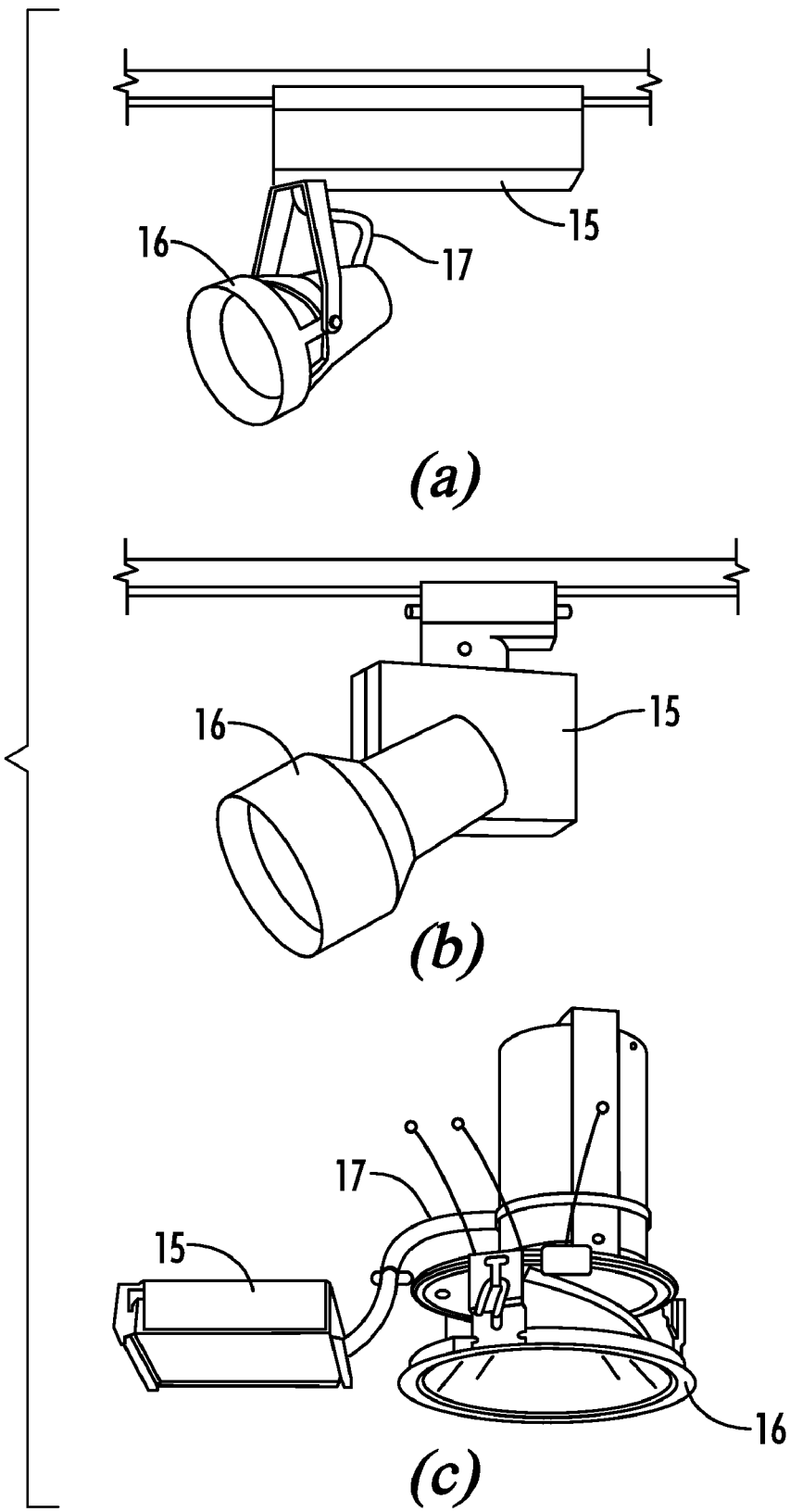
FIGS. 20(a), (b), and (c) are perspective views of different light fixtures using a ballast of the present invention.
Figure 21:
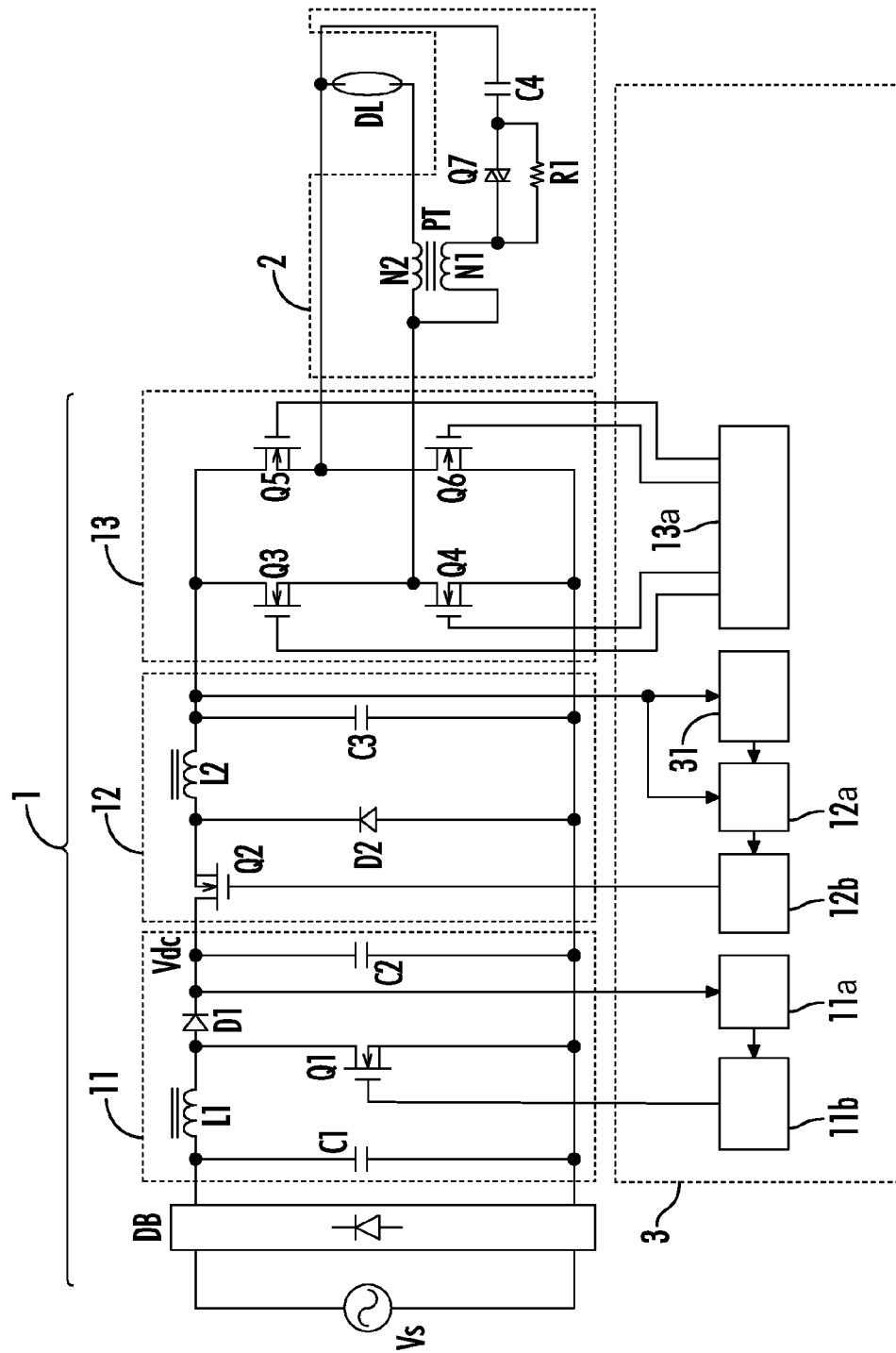
FIG. 21 is a circuit diagram of a conventional high intensity discharge lamp ballast.
Figure 22:
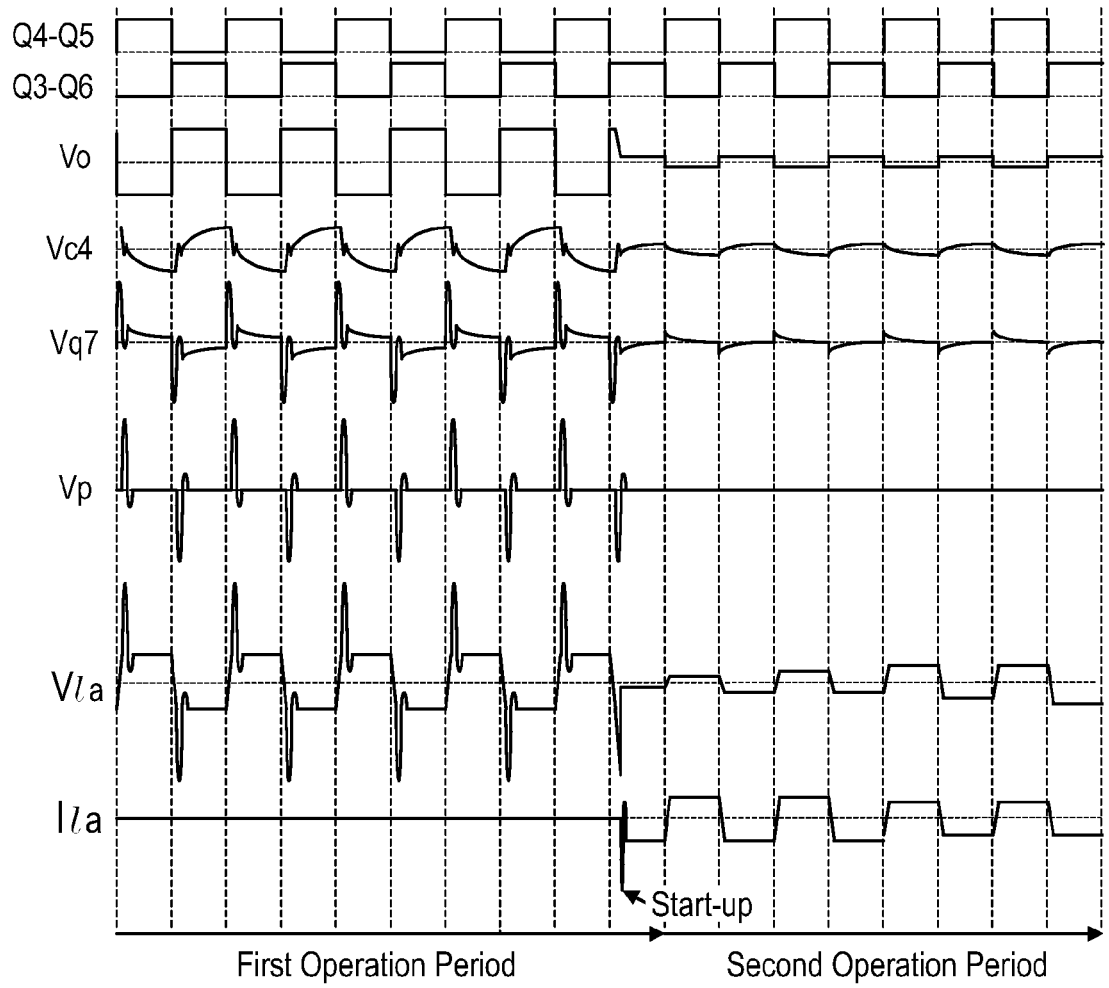
FIG. 22 is a waveform chart showing operational waveforms of various circuits of a conventional ballast.
Figure 23:
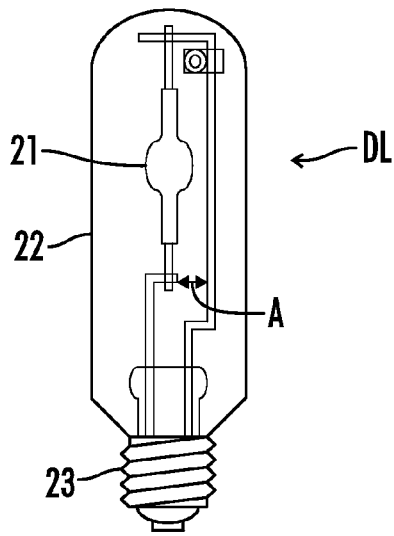
FIG. 23 is a front view illustrating a general configuration of a lamp suitable for use with the present invention.

A configuration of a lamp fixture using a ballast of the present invention is shown in FIG. 19 and in FIGS. 20(a), (b), and (c). In the drawings, DL represents a discharge lamp, and reference numerals 15, 16 and 17 represent a housing embodying the circuits of the ballast, a lamp body to which the lamp DL is attached, and a power cable, respectively. An illumination system may be constructed by combining a plurality of the lamp. FIGS. 20(a) and (b) show examples in which the lamp is used as a spotlight, and FIG. 20(c) shows an example in which the lamp is used as a downlight.

When the ballast described above is used in these lamp fixtures, it is possible to prevent generation of an unnecessary high starting voltage to insure power saving and safety even when a lamp is fails to be started at, for example, the end of useful life, and to provide a normal lamp with reliable starting and restarting characteristics.

Thus, although there have been described embodiments of the present invention of a new and useful electronic ballast for an electronic ballast for an HID lamp with lamp re-start control, it is not intended that such references be construed as limitations upon the scope of this invention except as set forth in the following claims.

What is claimed is:

1. An electronic ballast, comprising:
   a ballast circuit functional to supply electric power to a discharge lamp;
   a starting voltage generating circuit functional to generate a starting voltage to start a discharge lamp;
   a control circuit operably connected to the ballast circuit and to the starting voltage generating circuit, the control circuit functional to control the ballast circuit and the starting voltage generating circuit; and
   the control circuit comprising
      a lighting detector circuit functional to detect whether or not a connected lamp is lighting,
      a logic circuit functional to switch between a first operation period to operate the starting voltage generating circuit to start a lamp and a second operation period to maintain a steady arc discharge after a lamp has started discharging, based on a result of detection from the lighting detector circuit,
      a measurement circuit functional to measure operation information of the first operation period,
      a logic circuit functional to control operation during the first operation period based on a result of measurement from the measurement circuit, and
      a reset circuit functional to initialize the operation information of the first operation period measured by the measurement circuit upon continuation of the second operation period for a reference time or longer.

2. The ballast of claim 1 further comprising:
   the measurement circuit is further functional to measure operation information of the first operation;
   a circuit functional to measure a starting voltage generating period for which the high starting voltage is generated during the first operation period; and
   a circuit functional to measure a starting voltage quiescent period for which generation of the high starting voltage is interrupted.

3. The ballast of claim 2, wherein the operation information of the first operation period measured by the measurement circuit is a measurement time of the starting voltage generating period for which the high starting voltage is generated during the first operation period.

4. The ballast of any one of claims 2 through 3, wherein the circuit functional to measure a starting voltage generating period for which the high starting voltage is generated during the first operation continues measurement of the starting voltage generating period even after the lamp has lighted, and a shift to the second operation period has been completed, and determines that the second operation period has continued for the reference time or longer upon condition that the lamp has been lighting upon completion of the starting voltage generating period.

5. The ballast according to either claim 1 or 2, wherein the operation information of the first operation period measured by the measurement circuit is the duration of the first operation period.

6. The ballast of any one of claims 1 through 3, wherein the reference time is 0.5 seconds or longer.

7. The ballast of claim 6, wherein the reference time is 30 seconds or shorter.

8. A lamp fixture comprising a ballast according claim 1.

* * * * *